United States Patent
D Souza et al.

(10) Patent No.: US 12,283,272 B1
(45) Date of Patent: Apr. 22, 2025

(54) DETECTING UTTERANCE IN AUDIO

(71) Applicant: Amazon Technologies, Inc., Seattle, WA (US)

(72) Inventors: Henry Michael D Souza, San Diego, CA (US); Vladimir Adam, San Jose, CA (US); Ketan Ashok Kulkarni, Fremont, CA (US); Oliver Benjamin Hill, San Francisco, CA (US); Ragini Rajendra Prasad, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 369 days.

(21) Appl. No.: 17/379,382

(22) Filed: Jul. 19, 2021

(51) Int. Cl.
*G10L 15/22* (2006.01)
*G10L 15/08* (2006.01)
*G10L 21/0208* (2013.01)

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,558,758 B1 * | 1/2017 | Piersol | G10L 25/60 |
| 2005/0071159 A1 * | 3/2005 | Boman | G10L 21/0208 |
| | | | 704/233 |
| 2009/0024183 A1 * | 1/2009 | Fitchmun | A61N 1/36038 |
| | | | 607/57 |
| 2015/0222988 A1 * | 8/2015 | Sorensen | G10L 21/0208 |
| | | | 381/94.1 |
| 2016/0189707 A1 * | 6/2016 | Donjon | G10L 15/02 |
| | | | 704/228 |
| 2017/0133041 A1 * | 5/2017 | Mortensen | G10L 15/02 |
| 2019/0287522 A1 * | 9/2019 | Lambourne | H04R 3/12 |
| 2020/0098346 A1 * | 3/2020 | Kemmerer | G10K 11/17854 |
| 2020/0160853 A1 * | 5/2020 | Kishi | G10L 15/20 |
| 2020/0219493 A1 * | 7/2020 | Li | G10L 15/22 |
| 2020/0365167 A1 * | 11/2020 | Shanmugam | G10L 25/84 |
| 2020/0410993 A1 * | 12/2020 | Mäkinen | G10L 15/20 |
| 2023/0026347 A1 * | 1/2023 | Jancovich | H03G 9/005 |

* cited by examiner

*Primary Examiner* — Seong-Ah A Shin
(74) *Attorney, Agent, or Firm* — Kilpatrick Townsend & Stockton LLP

(57) ABSTRACT

Techniques for processing utterance audio are described. In an example, a computer system determines audio data representing an utterance detected by a device, and generates, based at least in part the audio data, first data representing at least one of portion of the utterance in a frequency domain. The first data specific is to a first frequency range. The computer system determines determining a second frequency range that is a subset of the first frequency range, the second frequency range meeting a frequency threshold, and generates, based at least in part on the first data, second data that represents the at least one portion in the frequency domain. The second data is specific to the second frequency range. The computer system determines, based at least in part on the second data, that additional audio data associated with the device is to be processed.

20 Claims, 16 Drawing Sheets

DETECTING UTTERANCE IN AUDIO

BACKGROUND

Different modalities are available to control devices. An example modality is visual and relies on graphical user interfaces. Another example modality is vocal and relies on a voice user interface. Voice-based modality can employ what is referred to as near-field voice recognition, in which a user speaks into a microphone located on a hand held device, such as a mobile device. Other voice-based modality systems employ far-field voice recognition, in which a user can speak to a device while the user is within the general vicinity of the device, e.g., within the same room, but not necessarily in close proximity to or even facing the device. Systems can support audio and video functionalities.

DETAILED DESCRIPTION

Figure 1:
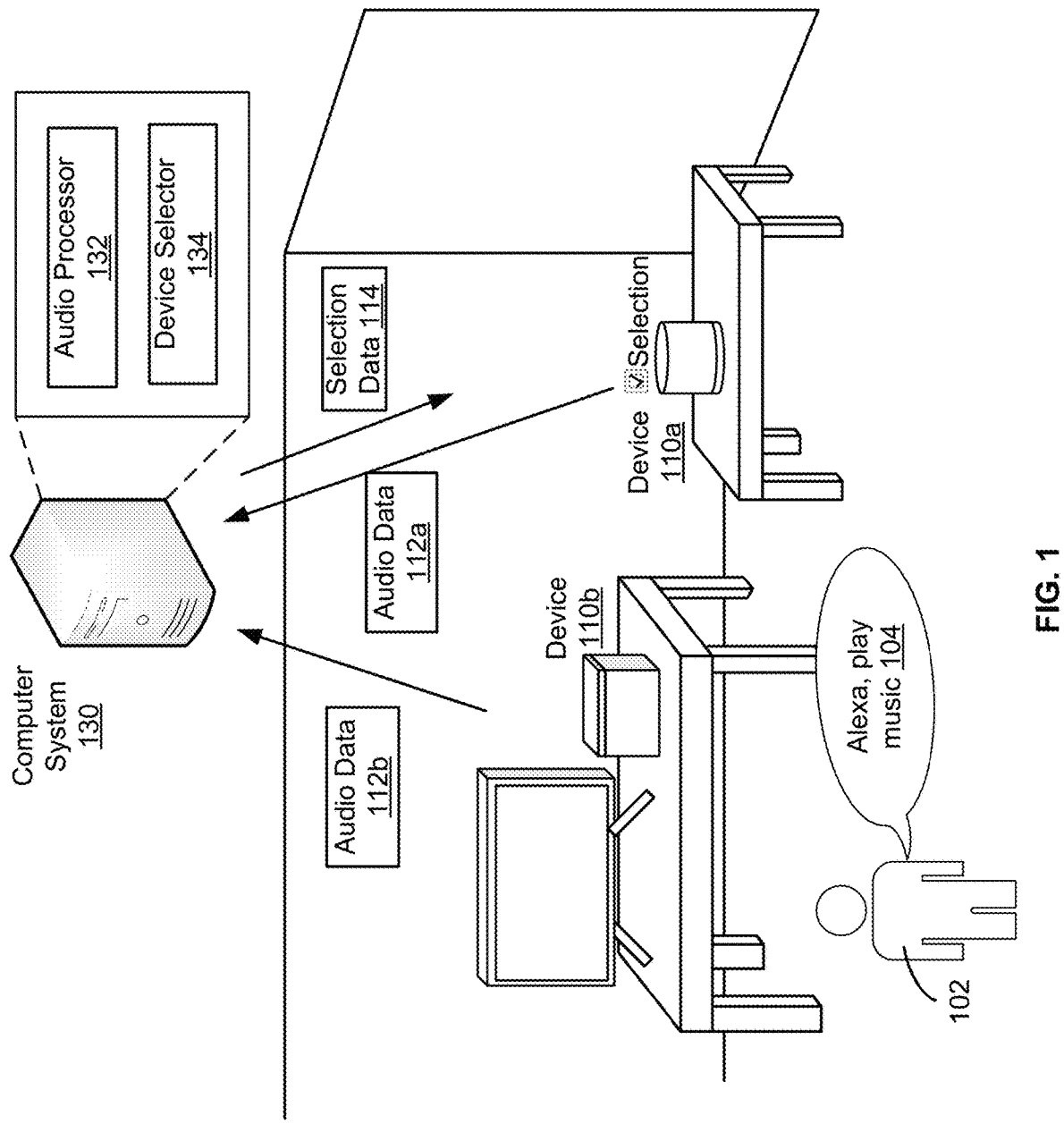
FIG. 1 illustrates an example of multiple devices receiving audio data, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified to not obscure the embodiment being described.

Embodiments of the present disclosure are directed to, among other things, detecting audio based on high frequency band measurements. In an example, a computer system determines audio data associated with a device. The audio data can include a first portion and a second portion, where the first portion corresponds to noise audio detected by a microphone of the device, and where the second portion corresponds to a superimposition of noise audio and utterance audio detected by the microphone. The computer system generates a first measurement based on the first portion, where the first measurement indicates a noise signal level over multiple frequency bands, such as in a frequency range between 20 Hz and 8,000 Hz. The computer system determines a subset of the frequency bands that are larger than a frequency band threshold. For example, the frequency band threshold may be in a range of 2,500 Hz to 4,000 Hz. The computer system generates a second measurement based on the second portion and the first measurement. The second measurement indicates an utterance signal level over the subset of frequency bands. Based on the second measurement, the computer system determines that an utterance is directed to the device and that the device can be selected for processing of additional audio data associated therewith.

To illustrate, consider an example of two smart speakers that are located in a same room or otherwise in earshot, both of which and a user can speak to by using a wakeword (e.g., "Alexa" or another word, words, or other predetermined combination of sounds that triggers system functionality). For example, the user may say "Alexa, play music" to trigger a music stream (e.g., "Your music is playing here," followed by a music output). The first smart speaker detects a user utterance and a wakeword included therein to then generate audio data. A first portion of the audio date corresponds to, e.g., 0.5 seconds of audio prior to the start of the user utterance, a second portion of 0.75 seconds that corresponds to the wakeword, and a third portion that corresponds to the remaining portion of the user utterance. Similarly, the second smart speaker detects the user utterance and generates corresponding audio data. A computer system, such as a speech processing system or other audio processing, receives and processes the noise and wakeword audio portions for each smart speaker to determine which smart speaker should be selected to remain in an unmute state such that the selected smart speaker can continue detecting audio and sending additional audio data to the computer system for further processing. The computer system generates a spectral measurement (e.g., power in decibels) from the first audio data that indicates a noise signal level of the first portion over thirty frequency bands, each 250 Hz wide, starting at about twenty Hz and ending at about 8,000 Hz. The computer system then determines that frequency bands twenty-three to twenty-six (e.g., corresponding to a frequency range of 5,750 Hz to 6,500 Hz) are larger than a frequency band threshold (e.g., frequency band fourteen corresponding to a frequency of 3,500 Hz), generates a second spectral measurement from the second portion indicating the noise and utterance signal level of the second portion over the frequency bands twenty-three to twenty-six. By subtracting the first spectral measurement from the second spectral measurement, the computer system determines a third spectral measurement of the utterance signal level present in the second portion over the frequency bands twenty-three to twenty-six. Similar audio processing is performed on the audio data received from the second smart speaker. The spectral measurements of the utterance signal level in each of the audio data are input to an acoustic loudness model that outputs scores associated with each smart speaker, where each score indicates a likelihood of the user utterance being directed at the corresponding smart speaker. Having the highest score, the computer system selects the first smart speaker.

Embodiments of the present disclosure provide various technological advantages. For example, by filtering out audio at lower frequency bands, which are often associated with noise audio that can lead to incorrect determinations of utterance directionality, and by processing audio at the higher frequency bands, a more accurate directionality determination becomes possible. In turn, more accurate directionality results in a more accurate device selection when a selection needs to be made between multiple candidate devices. As a result, the overall user experience can be improved and it becomes more likely to select the device to which the user speech is directed.

FIG. 1 illustrates an example of multiple devices receiving audio data, according to embodiments of the present disclosure. As illustrated, a user 102 provides an utterance 104 that is received by each of devices 110a-b. For example, the utterance 104 can be "Alexa, play music" and may be provided in a vicinity where the microphones of the devices 110a-b can detect the utterance 104. Each of the devices 110a-b generates audio data 112a-b, respectively, based on an audio sampling of at least a portion of the utterance 104. For example, the devices 110a-b can generate audio data 112a-b for a portion of the utterance 104 that corresponds to a wakeword (e.g., "Alexa") and a remaining portion of the utterance 104 (e.g., "play music"). The audio data 112a-b can additionally include a portion of audio sampled prior to the utterance 104, where this portion is included in the audio data 112a-b upon each device 110a-b detecting the wakeword. This portion of audio may represent noise audio present in the vicinity of the devices 110a-b. A computer system 130 can receive the audio data 112a-b and based on at least the noise portion and the wakeword portion in each audio data 112a-b select one of the devices 110a-b for which further audio processing can be performed. FIG. 1 illustrates the computer system selecting the device 110a, whereby this device 110a can, based on the selection, detect and send additional audio data to the computer system 130 for further processing.

A device can represent an end user device that supports one or more input/output modalities (e.g., including graphical user interfaces and voice-based interfaces) and that can communicate with a computer system 130. For example, the device can be a smart speaker, a voice-controlled device, a smartwatch, smartphone, a tablet, a laptop, a desktop, a smart appliance, an Internet of Things (IoT) device, or any other suitable end user device. In FIG. 1, device 110a is illustrated as a smart speaker and device 110b is illustrated as a voice-controlled streaming device for controlling and streaming audio and video to a television.

Figure 13:
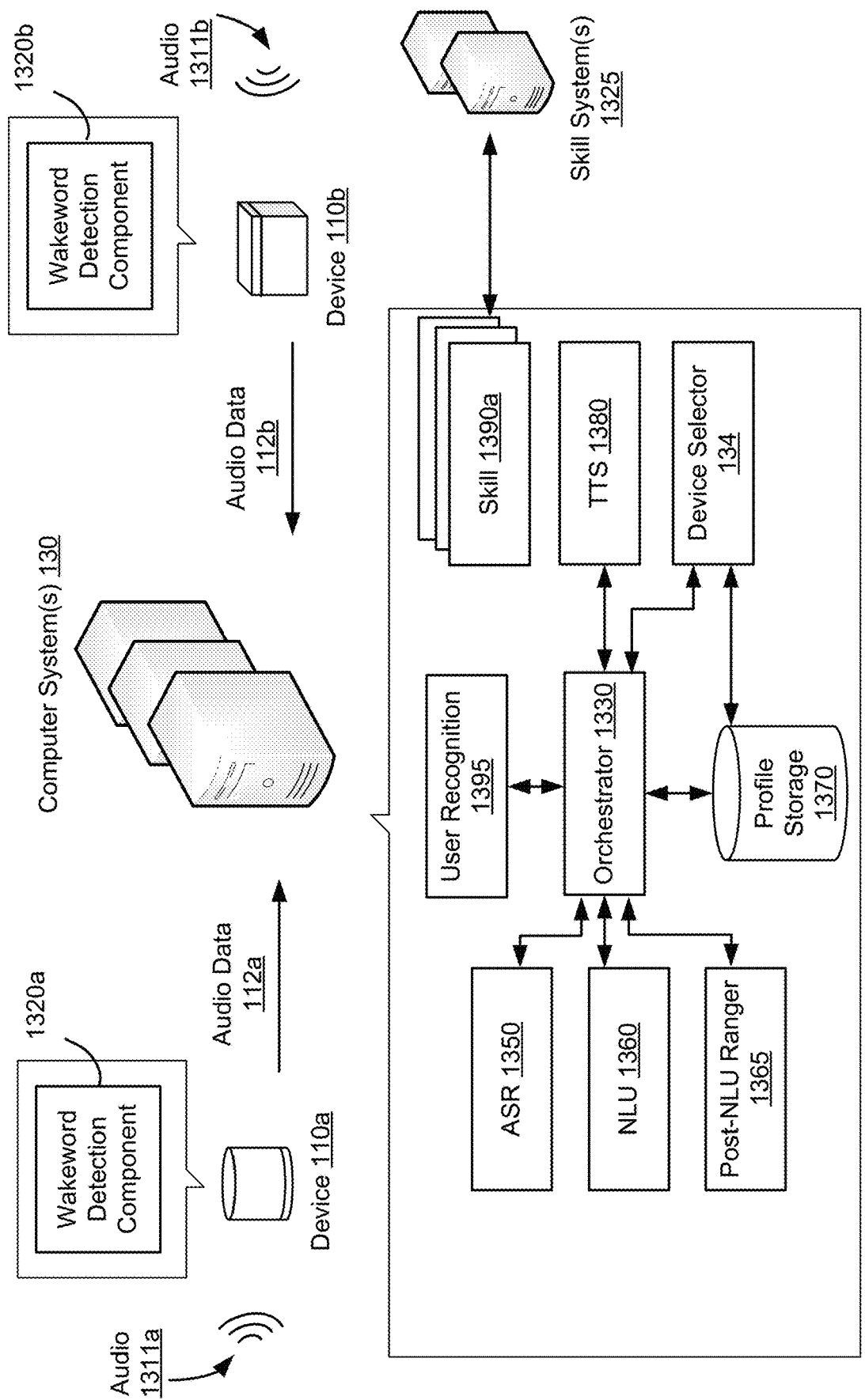
FIG. 13 is a conceptual diagram of components of a system according to embodiments of the present disclosure.

In an example, the computer system 130 receives the audio data 112a-b generated by the devices 110a-b. The computer system 130 can include hardware and software suitable for communicating with devices and computing services (e.g., third party services). For instance, the computer system 130 can be implemented as a set of servers or a set of resources on servers (e.g., in a datacenter and/or as a cloud-based service). For instance, the computer system 130 can be implemented as a speech processing system. FIG. 13 illustrates detailed components of such a system. As illustrated in FIG. 1, the computer system 130 implements an audio processor 132 that performs measurements to process the audio data 112a-b. For example, the audio processor 132 may determine a measurement of an audio signal level of each audio data 112a-b over a range of frequencies (e.g., in the range of twenty Hz to eight thousand Hz). In addition, the computer system 130 implements a device selector 134 that executes logic controlling which of the devices 110a-b is to be selected based on the utterance 104. Upon a selection of a device, additional audio data received from the device can be further processed by the computer system. In a way, the selected device becomes the input device for the additional audio data. Based on the measurement of the audio signal level corresponding to a wakeword in each of the audio data 112a-b, the device selector 134 can determine which of the devices 110a-b the utterance 104 was more likely directed towards and can select this device to receive.

As illustrated, the computer system 130 implements the audio processor 132 and the device selector 134 to generate the selection data 114. In an example, the selection data 114 can indicate the device that was selected. In another example, the selection data 114 can alternatively or additionally indicate the device(s) that was (were) not selected.

The computer system 130 can send the selection data 114 to the selected device (e.g., device 110a in FIG. 1). The selection data 114 can cause the selected device to act as an input device for additional audio data. Additionally or alternatively, the selection data 114 can be sent to an unselected device (e.g., device 110b in FIG. 1), which can cause the unselected device to stop acting as an input device for additional audio data. In an example, the selection data 114 indicates to a device whether the device was selected or not. A directive (e.g., a set of instructions) may also be sent from the computer system 130 to the device to act as an input device or stop acting as the input device as applicable.

Acting as an input device can include detecting audio by a microphone of the input device, generating audio data corresponding to the detected audio, and sending the audio data from the input device to the computer system 130. Stop acting as an input device can include powering off the microphone, muting the microphone, not generating the audio data, and/or not sending the audio data by the device, or if the audio data is sent, the computer system 130 not performing any of the following: processing the audio data, performing automatic speech recognition to generate text from the audio data, performing natural language understanding of the text, triggering an executable action based on the natural language understanding, and/or any other operation that the computer system 130 can perform based on the audio data when the device is acting as an input device.

Although FIG. 1 illustrates two devices, the embodiments of the present disclosure are not limited as such. For example, more than two devices can be located in proximity of each other (e.g., within a same space). The computer system 130 performs audio processing and device selection of one of these devices. In yet another example, a single device can be located in a space or can detect the user utterance 104. In this case, the device selection may be optionally performed.

Generally, noise audio can be any type of noise generated from a noise source other than an utterance source including white noise, background noise, or any audio that does not include utterance audio. In comparison, utterance audio can be audio generated by an utterance source. FIG. 1 illustrates a user as an utterance source, although non-user utterance sources are possible. For example, an utterance source can be a pet, a door bell, a window glass, a smoke alarm, or any other utterance source, where the pet's utterance can be an animal sound, the door bell's utterance can be a ring, the window glass' utterance can be a glass shattering sound, the smoke alarm's utterance can be a smoke alert, etc.). An utterance can be detected and processed to provide different types of services. For instance, a user utterance (e.g., speech of a human) can be processed to provide a content streaming service to the user, or any other requested service indicated by the utterance. In comparison, a smoke alarm utterance can be processed to provide a home safety service.

Although a computer system remote from a device is illustrated as performing audio processing of the device and other devices, the embodiments of the present disclosure are not limited as such. For example, the audio processing can be local to each device or can be performed on one of the devices that generates its own audio data and receives other audio data from one or more other devices (e.g., in the case of a phone that processes its audio data and the audio of a watch connected with the phone, earbuds connected with the phone, a tablet connected with the phone, and/or any other user device connected with the phone).

Figure 2:
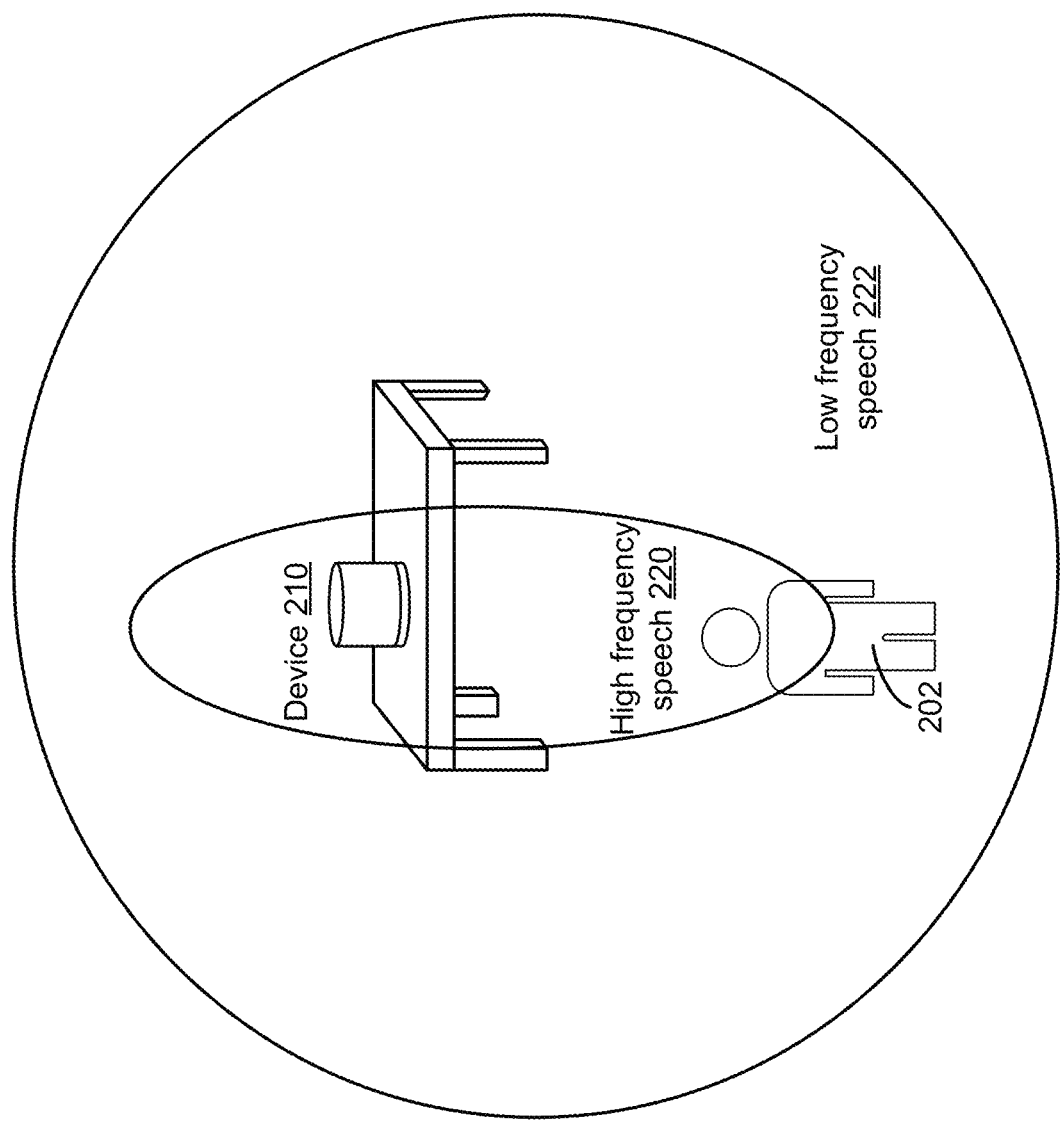
FIG. 2 illustrates an example of frequencies of speech, according to embodiments of the present disclosure.

FIG. 2 illustrates frequencies of speech produced by a user 202, according to embodiments of the present disclosure. The audible spectrum, or the range of frequencies that are detectable by a human ear, is between 20 Hz and 20 kHz. In an example, a device 210 that detects and processes speech may process a range of frequencies within the audible spectrum. For example, the device 210 can process frequencies between 20 Hz and 8,000 Hz. Speech of the user 202 produces high frequency speech 220 and low frequency speech 222. High frequency speech 220 can be considered speech with a frequency over 2,500 Hz, 4,000 Hz, or a frequency threshold between 2,500 Hz and 4,000 Hz (e.g., 3,500 Hz). Low frequency speech 222 can be considered speech having a frequency smaller than the frequency threshold.

The high frequency speech 220 can be directional, where the acoustic waves at the higher frequencies travel in a direction that the user 202 faces when speaking. In comparison, the low frequency speech 222 is less directional, where the acoustic waves at the lower frequencies can travel relatively longer distances and are subject to relatively more echoing than the high frequency speech 222. As illustrated, the user 202 faces the device 210 when speaking. The device 210 receives the high frequency speech 220 based on, among other factors, its directionality. The device 210 also receives the low frequency speech based on, the low frequency acoustic waves of the user 202 and the low frequency acoustic waves echoing from objects (e.g., walls) in the vicinity of the user 202 and/or the device 210.

Although embodiments of the present disclosure are described in connection with high frequency speech and low frequency speech, the embodiments are not limited as such. For example, a more granular definition can be used based on a different number of frequency ranges. For instance, a low frequency speech can be defined to have a frequency less than 1,000 Hz, a medium frequency speech can be defined to have a frequency between 1,000 Hz and 3,500 Hz, and a high frequency speech can be defined to have a frequency larger than 3,500 Hz. Rather than processing the speech across the entire frequency spectrum detectable by a device (e.g., 20 Hz to 8,000 Hz), speech can be processed in a subset of targeted frequency ranges (e.g., in the high and/or low frequency ranges).

Figure 3:
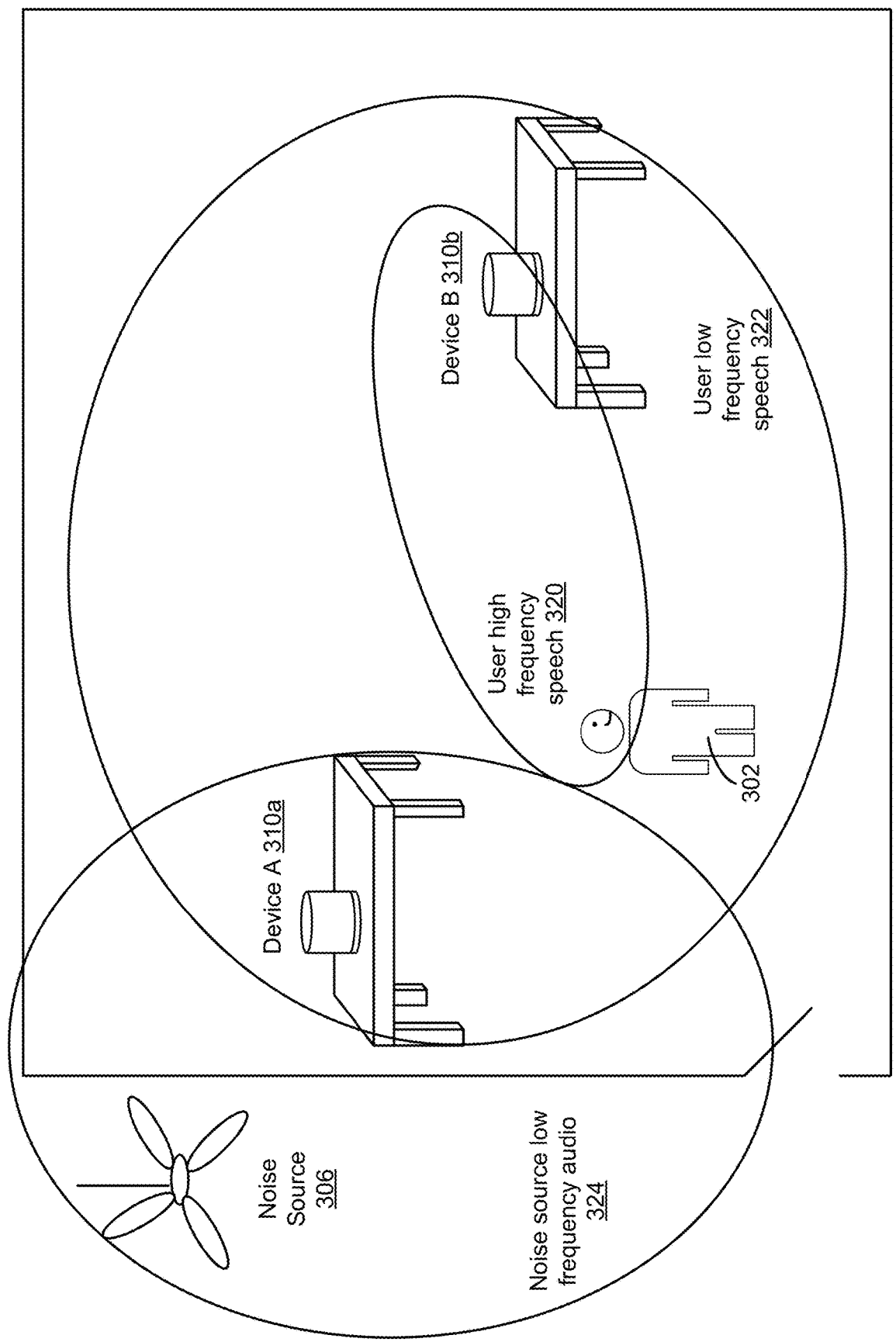
FIG. 3 illustrates an example frequencies of speech produced by multiple sources, according to embodiments of the present disclosure.

FIG. 3 illustrates frequencies of speech produced by multiple sources, according to embodiments of the present disclosure. Similar to FIG. 2, a user 302 produces speech that has high and low frequency components. User high frequency speech 320 is directed towards and detected by a device B 310*b*. User low frequency speech 322 is detectable in other portions of the room and is detected the device B 310*b* and by a device A 310*a*. The device A 310*a* also detects noise source low frequency audio 324 that is generated by a noise source 306. The noise source 306 is illustrated as a fan in FIG. 3, but the noise source 306 may be any other audio source that generates noise audio.

A computer system, such as the computer system 130 in FIG. 1, can receive audio data generated by each of the device A 310*a* and the device B 310*b* based on the detected audio at each device. For example, the audio data received from the device A 310*a* can correspond to the user low frequency speech 322 and the noise source low frequency audio 324. In comparison, the audio received from the device B 310*b* can correspond to the user low frequency speech 322 and the user high frequency speech 320. To determine which device the user 302 has directed speech towards, and thus which device should respond, the computer system may compare audio signal level measurements of the audio data from each of the device A 310*a* and the device B 310*b*. An example of an audio signal level measurement includes a spectral measurement of the electrical power or mechanical pressure of audio detected by a microphone of a device. Since the noise source low frequency audio 324 is additionally included in the audio data from device A 310*a*, the computer system may determine that its measurement is higher than that of device B 310*b*. The computer system can select the device A 310*a* to be set as an input device for additional audio data, which is not the device to which the user 302 directed their utterance, leading to a suboptimal user experience.

Figure 4:
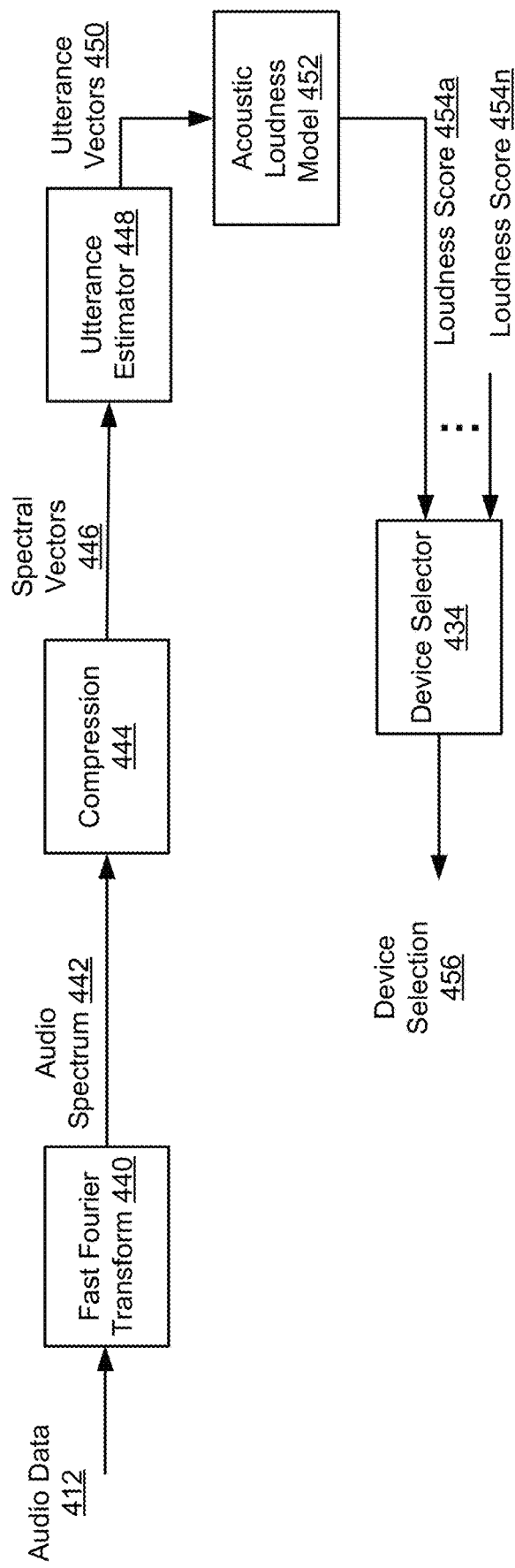
FIG. 4 illustrates a block diagram of an example of a process for determining directionality of an utterance based on spectral measurements, according to embodiments of the present disclosure.

FIG. 4 illustrates a block diagram of an example of a process for determining directionality of an utterance based on spectral measurements, according to embodiments of the present disclosure. The process may be performed by components of a computer system, such as the computer system 130 in FIG. 1.

In an example, the computer system receives audio data 412 that corresponds to a portion of an utterance (e.g., a wakeword portion of the utterance, with noise superimposed therewith) detected by a device and to noise detected prior to the utterance. In an example, the device, having proper user permissions and operating in compliance with all user privacy requirements, may receive and digitize an audio signal to generate audio data. This audio data indicates, for example, amplitudes of audio samples of the audio signal according to a sampling rate and a block length. Upon detecting the wakeword in the digitized audio, the device may generate the audio data 412 by including therein the noise portion (e.g., a 0.5 seconds audio portion) that precedes the wakeword detection and the superimposed noise and wakeword portion (e.g., the next 0.75 seconds). In an example, the audio data 410 corresponds to twenty thousand audio samples generated for a 1.25 second time window at a 16 KHz sampling rate. The first eight thousand samples correspond to the 0.5 seconds of noise audio, and the remaining twelve thousand audio samples correspond to the 0.75 seconds of superimposed noise and wakeword audio. Further, the audio processing can involve audio frames, where an audio frame corresponds to a set of the audio samples. For example, each frame can correspond to 10 milliseconds of audio or, equivalently, one hundred sixty audio samples. In this example, one hundred twenty-five audio frames correspond to the 1.25 seconds of audio and the twenty thousand audio samples.

The computer system can perform a Fast Fourier Transform (FFT) 440 on the audio data 412. The FFT 400 can be performed for each frame, by using the one hundred sixty audio samples of that frame and additional samples from preceding frames (e.g., for a total of five hundred twelve audio samples). FFT 440 produces an audio spectrum 442 of two hundred fifty-six data points that corresponds to a spectral measurement of the audio signal level.

In an example, the computer system performs compression 444 on the audio spectrum 442. The compression 444 relies on frequency bands, each representing a frequency range. For example, the audio spectrum 442 can be compressed into thirty-two frequency bands, each representing a 250 Hz range. The computer system can sum up consecutive frequency FFT outputs in the audio spectrum 442 to generate the thirty-two frequency bands. As an example, the frequency band 0 can correspond to a sum of the first eight FFT outputs of the audio spectrum 442 and represent 0 Hz to 249 Hz, frequency band one can correspond to a sum of FFT outputs nine through sixteen of the audio spectrum 442 and represent 250 Hz to 499 Hz, and so on. The computer system generates spectral vectors 446 over the thirty-two frequency bands (e.g., each spectral vector corresponds to a frame and includes thirty-two elements, where the value of each element corresponds to a frequency band and is equal to the sum of the eight FFT outputs generated for the frame and associated with the frequency band). As such, a spectral vector is determined for each frame and includes the summed FFT outputs for each of the thirty-two frequency bands. The first fifty spectral vectors correspond to frames one to fifty and represent noise audio. The next seventy-five spectral vectors correspond to frames fifty-one to one hundred twenty-five and represent superimposed noise and utterance audio.

The computer system then uses an utterance estimator 448 to differentiate noise data from utterance data in the spectral vector 446. The utterance estimator 448 determines a first spectral measurement indicating an average noise signal level from the frames prior to the detection of the wakeword (e.g., for the first 0.5 seconds or, equivalently, the fiftieth frame). For example, the first fifty spectral vectors are averaged to generate an average noise spectral vector. The utterance estimator 448 also assumes that the noise audio remains unchanged during the utterance. Accordingly, the utterance estimator 448 subtracts, for each of frames fifty-one and on, the average noise spectral vector from the corresponding spectral vector to determine, for that frame, the corresponding utterance spectral vector. The utterance spectral vector of a frame represents the estimated utterance audio at that frame over the thirty-two frequency bands.

In an example, an acoustic loudness model 452 processes the utterance vectors 450 to generate a loudness score 454a that is indicative of the utterance being directed at the device. The acoustic loudness model 452 may process the entirety of each utterance vector, or a portion of the utterance vector (e.g., frequency bands two through twenty-six) to generate the loudness score 454a. Different types of acoustic loudness models are possible. The acoustic loudness model 452 may average, per frequency band, the utterance vectors 450 to generate an average utterance spectral vector. The magnitude of this average vector can be divided by a sensitivity of the device's microphone to generate a loudness score 450a. In another example, the acoustic loudness model 452 may also involve a characteristic matrix determined based on locations of devices within a space. The characteristic matrix includes inter-device attenuation values representing the attenuation experiences between a pair of devices. An example of the acoustic loudness model 452 is described in U.S. patent application Ser. No. 16/583,699, which is incorporated hereby reference.

The acoustic loudness model 452 can process utterance vectors for audio data generated by multiple devices for the same utterance. A loudness score can be determined for each utterance vector. For example, if "n" devices generate audio data for an utterance, the acoustic loudness model 452 can produce loudness scores 454a-n.

In an example, a device selector 434 of the computer system receives the loudness scores 454a-n to select a device as an input device for additional audio data. The device selector 434 may compare the loudness scores 454a-n to determine which score is the highest. The device selector 434 can then select a device associated with the highest loudness score to be the input device. A device selection 456 can be output indicating the selected device. The device selection 456 may be selection data that is sent to the selected device.

Figure 5:
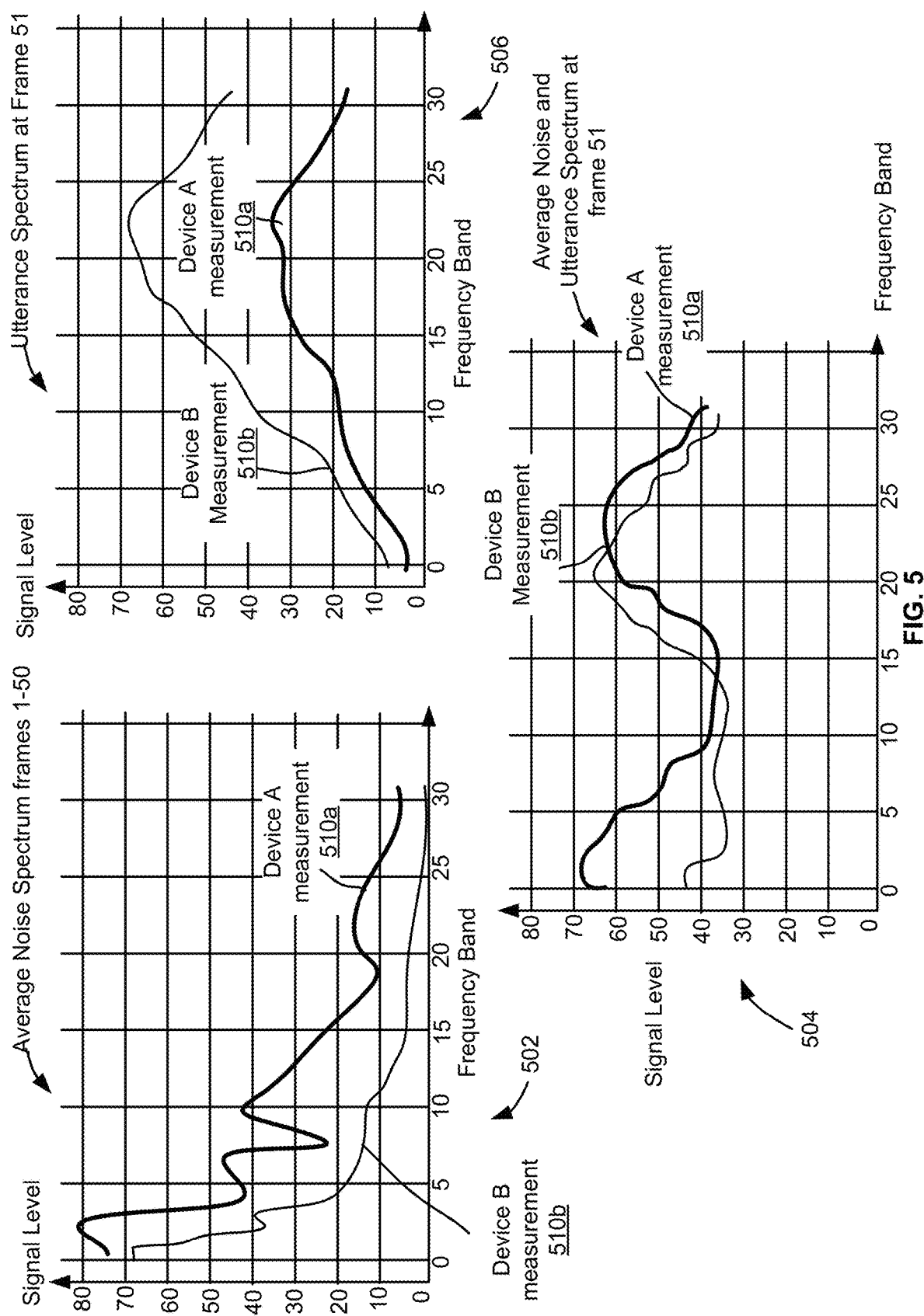
FIG. 5 illustrates audio spectrums of audio detected by two devices, according to embodiments of the present disclosure.

FIG. 5 illustrates audio spectrums of audio detected by two devices, according to embodiments of the present disclosure. The devices can correspond to device A 310 a and device B 310b of FIG. 3. The audio spectrums show the signal levels (e.g., in decibels) of the audio received by or frequency bands one through thirty-two (labeled in FIG. 5 with indexes "0" through "31").

The plot 502 shows the audio spectrums of the two devices for frames one through fifty, which correspond to a period of time prior to an utterance being detected. The noise signal level for the device A 310a (indicated with the device A measurement 510a in plot 502) is higher than the signal level for the device B 310b (indicated with the device B measurement 510b in plot 502) over all frequency bands because the device A 310a may be positioned closer to a noise source (e.g., the noise source 306 of FIG. 3).

The plot 504 shows an average noise and utterance spectrum at frame fifty one, which corresponds to a superimposition of noise audio (e.g., from the noise source) and utterance audio at the beginning of an utterance. The audio signal level for the device A 310a (indicated with the device A measurement 510a in plot 504) is higher than the signal level for the device B 310b (indicated with the device B measurement 510b in plot 504) at lower and higher frequency bands in part because of the closer proximity of the noise source to the device A 310a.

The plot 506 shows an utterance spectrum at frame fifty one. The spectral content of the noise audio may be estimated and removed by subtracting the noise signal levels from the corresponding audio signal levels. The utterance signal level for the device B 310b (indicated with the device B measurement 510B in plot 506) is higher than the signal level for the device A 310a (indicated with the device A measurement 510a in plot 506) over all frequency bands.

Figure 6:
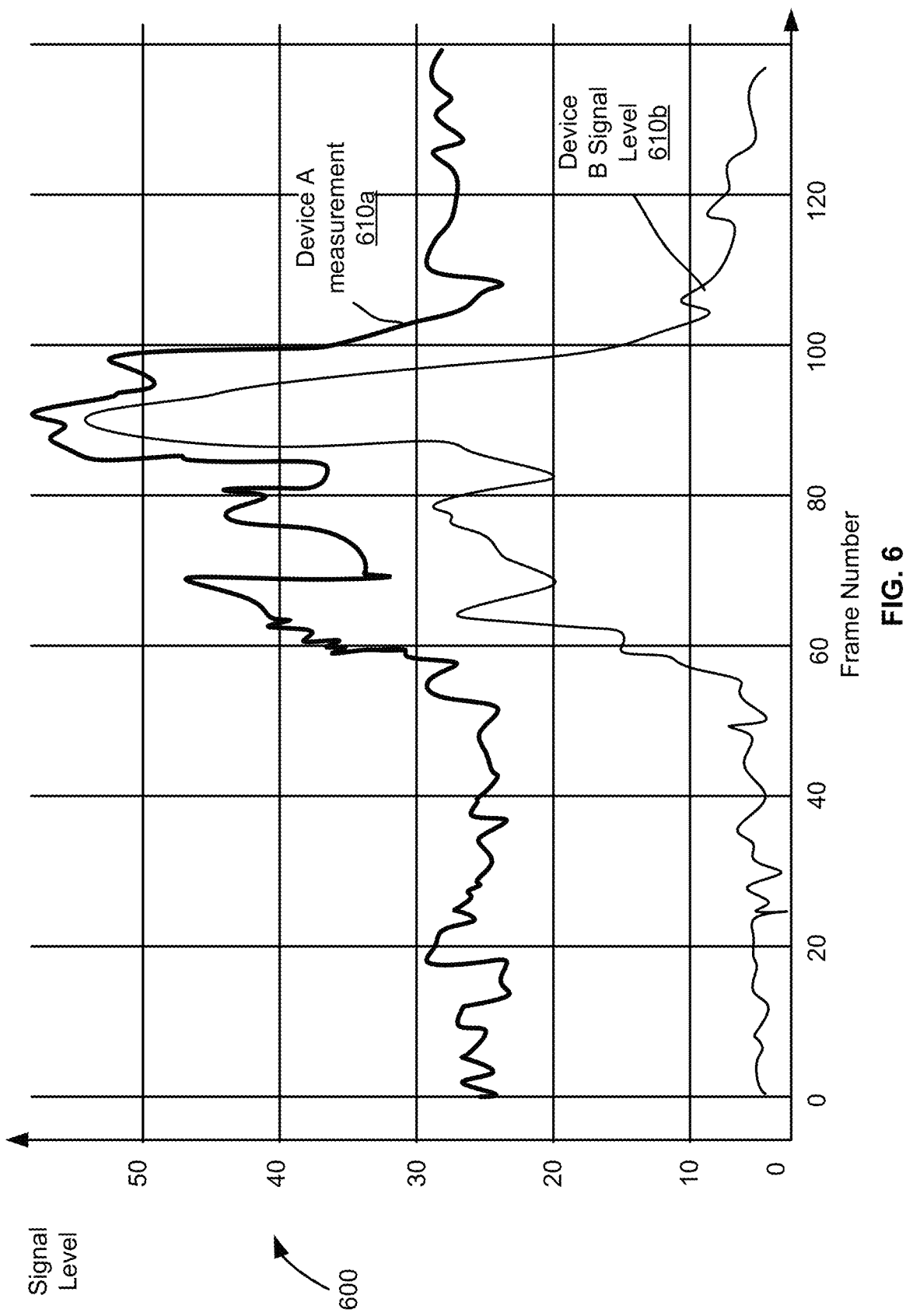
FIG. 6 illustrates an example of an audio spectrum for audio data generated by two devices corresponding to an utterance, according to embodiments of the present disclosure.

FIG. 6 illustrates an audio spectrum 600 for audio data generated by two devices corresponding to an utterance, according to embodiments of the present disclosure. The two devices can include device A 310*a* and device B 310*b* of FIG. 3. The audio spectrum 600 can include a spectral measurement 610*a* that corresponds to the signal level of device A 310*a* and a spectral measurement 610*b* that corresponds to the signal level of device B 310*b*. An FFT is performed for each frame, and the audio spectrum 600 shows the FFT for each frame. From frame zero to frame fifty, the utterance has not yet begun, so only noise data is represented in the audio spectrum 600. The spectral measurement 610*a* indicates a higher noise signal level than that indicated by the spectral measurement 610*b* during the first fifty frames. At frame fifty-one, the utterance begins, as illustrated by the increase in amplitude of the signal level, which may be measured in decibels or other appropriate audio measurement units, associated with the spectral measurements. The amplitude of the spectral measurement 610*a* remains higher for frames fifty through one hundred twenty-five.

The audio spectrum 600 represents frequency bands two through twenty-six. So, over these frequency bands, the device A 310*a* is shown as having a higher audio signal level. This may indicate that the utterance is directed at device A 310*a*, and thus that the device A 310*a*, rather than the device B 310*b*, is to be set as an input device for additional audio data processing.

Figure 7:
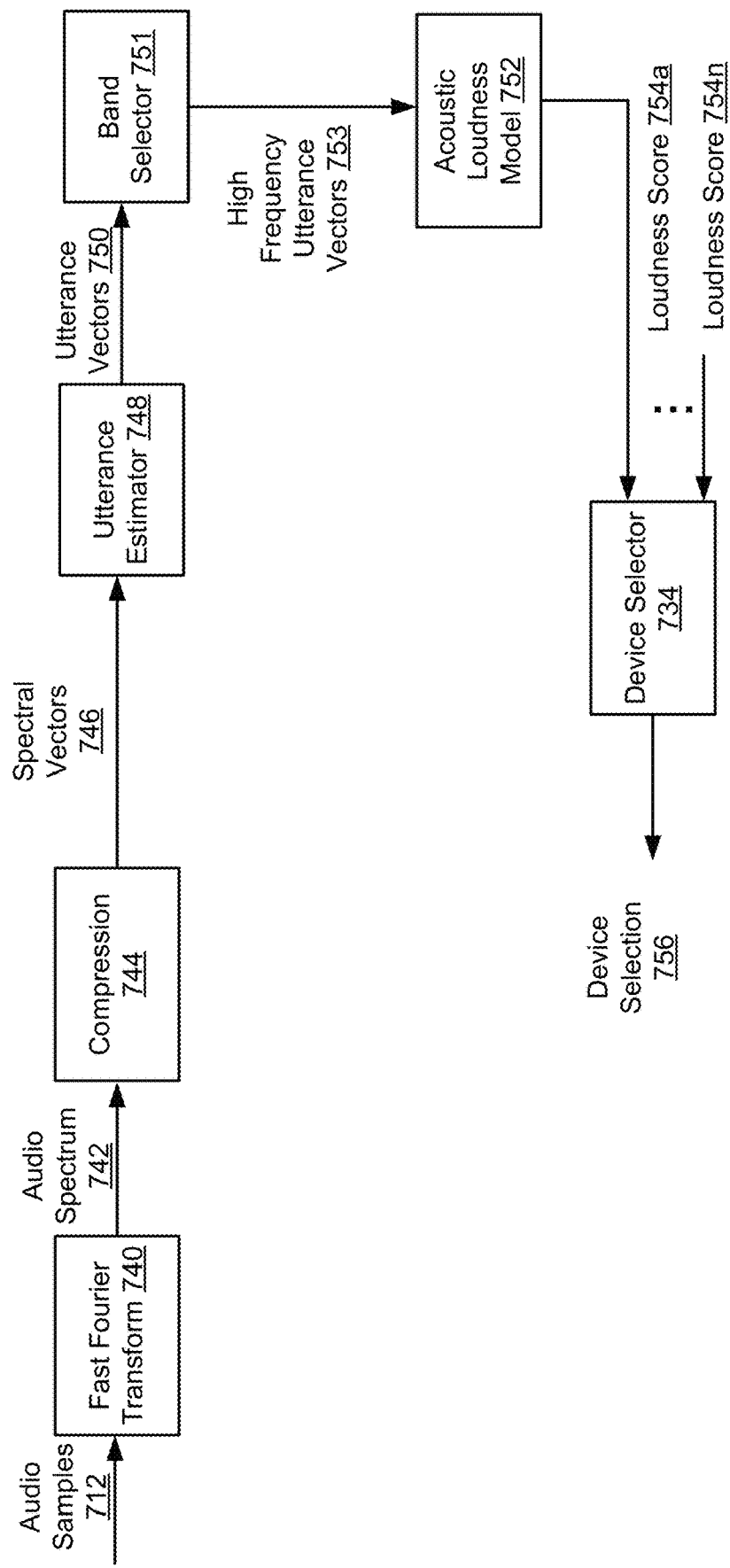
FIG. 7 illustrates a block diagram of an example of a process for determining directionality of an utterance based on information contained in high frequency bands, according to embodiments of the present disclosure.

FIG. 7 illustrates a block diagram of example of a process for determining directionality of an utterance based on information contained in high frequency bands, according to embodiments of the present disclosure. The process may be performed by components of a computer system, such as the computer system 130 in FIG. 1. Audio samples 712, Fast Fourier Transform (FFT) 740, compression 744, spectral vectors 746, utterance vectors 750, utterance estimator 748, acoustic loudness model 752, loudness scores 754*a-n*, device selector 734, and device selection 756 can be examples of the corresponding components in FIG. 4 (FFT 440, compression 444, spectral vectors 446, utterance vectors 450, utterance estimator 448, acoustic loudness model 452, loudness scores 454*a-n*, device selector 434, and device selection 456).

In an example, a band selector 751 receives the utterance vectors 750 prior to the acoustic loudness model 752. The band selector 751 can select a subset of frequency bands larger than a frequency threshold. The subset may be one or more frequency bands. When multiple frequency bands are used, these frequency bands may be contiguous. For example, the frequency threshold may be between 2,500 Hz and 4,000 Hz (or, equivalently, between frequency band ten and sixteen), so the band selector 751 can select frequency bands twenty-three to twenty-six, which correspond to 5,750 Hz to 6,500 Hz. The band selector 751 can generate high frequency utterance vectors 752 from the utterance vectors 750. For example, whereas an utterance vector is generated for a frame and includes thirty-two elements corresponding to thirty-two frequency bands, a corresponding high frequency utterance vector is also generated for the frame and includes four elements corresponding to four frequency bands (e.g., the frequency bands twenty-three to twenty-six). In other words, the high frequency utterance vector is a subset of the utterance vector, where this subset contains the high frequency elements. The high frequency vector represents a spectral measurement of the utterance signal level at the frame over the high frequency bands.

In an example, the band selector 751 selects multiple frequency band subsets (each of which is a frequency band range that includes one or more frequency bands). A second subset can also have a frequency band larger than the frequency threshold. The second subset may be contiguous with the first subset, overlapping with the first subset, or non-overlapping and non-contiguous with the first set. For example, if the first subset is frequency bands twenty-three to twenty-six, the second subset may be frequency bands nineteen to twenty-two, twenty to twenty-three, sixteen to nineteen, or any other suitable subset of frequency bands. The resulting high frequency utterance vectors 753 includes elements each corresponding to one of the selected frequency bands.

The high frequency utterance vectors 753 from the band selector 751 can be input to the acoustic loudness model 752. The acoustic loudness model 752 generates a loudness score for each device over the selected subset of frequency bands. Since high frequency speech is relatively more directional than low frequency speech, a higher utterance signal level received by a device at a higher frequency can indicate speech directed toward the device. Thus, the acoustic loudness model 752 may generate a higher score for a device with a higher utterance signal level over the subset of high frequency bands. The device selector 734 then determines the device selection 756 based on the loudness scores 754*a-n*.

Figure 8:
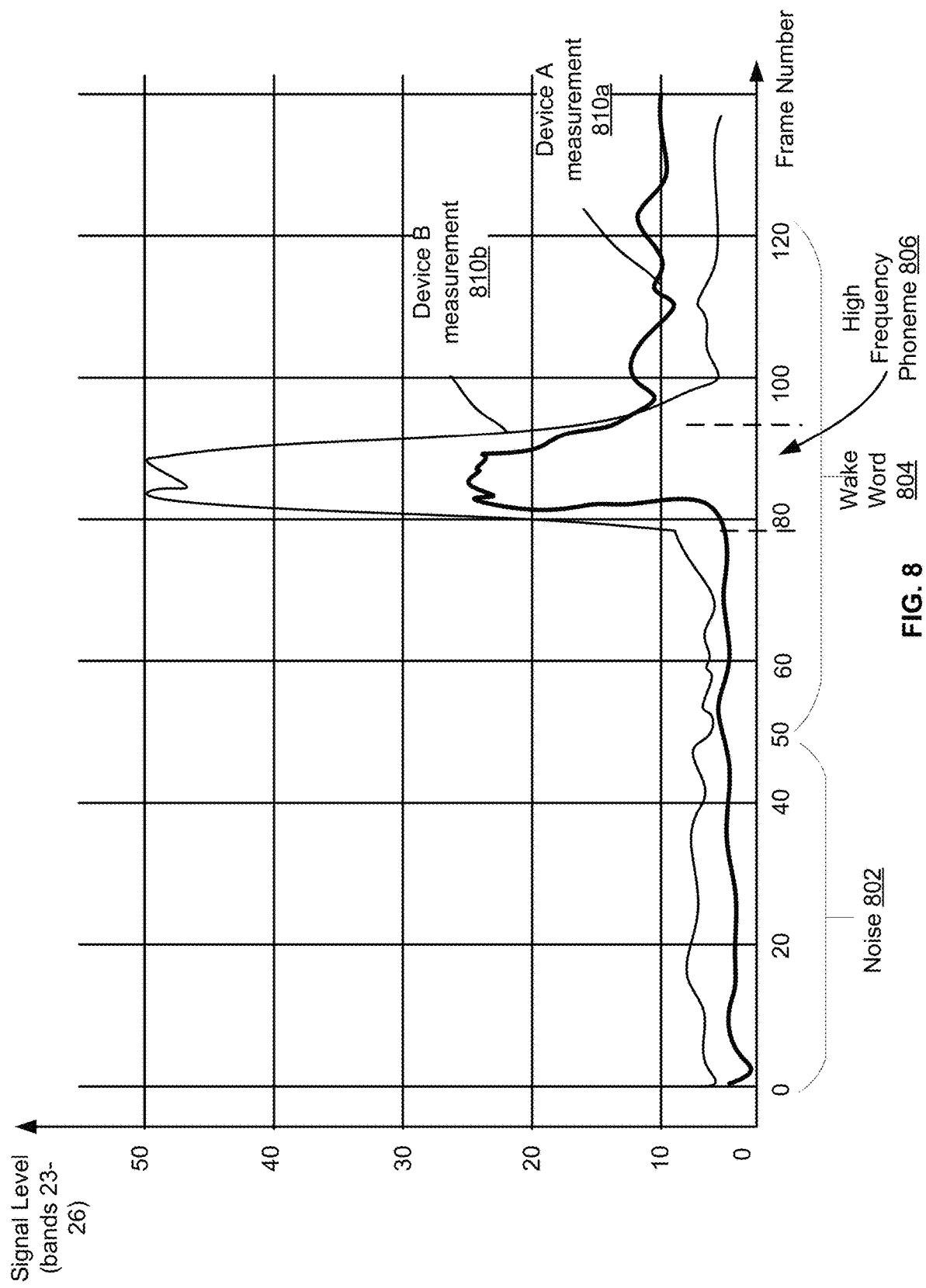
FIG. 8 illustrates an example of an audio spectrum for high frequency bands of audio data generated by two devices, according to embodiments of the present disclosure.

FIG. 8 illustrates an example of an audio spectrum for high frequency bands of audio data generated by two devices, according to embodiments of the present disclosure. The devices can correspond to device A 310*a* and device B 310*b* of FIG. 3. The plot shows the signal levels for audio frames corresponding to audio data generated based on an utterance detected by the devices (the signal levels are indicated with device A measurement 810*a* and device B measurement 810*b*). A subset of the frequency bands selected by a band selector (e.g., the band selector 751 in FIG. 7) of the audio data are represented. As illustrated, FIG. 8 shows frequency bands twenty-three through twenty-six.

Frames one through fifty represent noise 802 detected by the devices prior to the utterance. As illustrated in FIG. 8, the noise content at the high frequency bands is substantially low or insignificant. Frames fifty to one hundred twenty-five represent a wakeword 804 spoken during the utterance. For example, the wakeword 804 can be "Alexa". The wakeword 804 includes a high frequency phoneme 806, which is a portion of the wakeword 804 that is perceptually distinct from the other portions. For example, the "x" sound in "Alexa" can be the high frequency phoneme 806. With the representation of the high frequency spectral bands of twenty-three to twenty-six, device B 310*b* has a higher audio signal level than device A 310*a*, indicating that the utterance is directed toward device B 310*b*.

Figure 9:
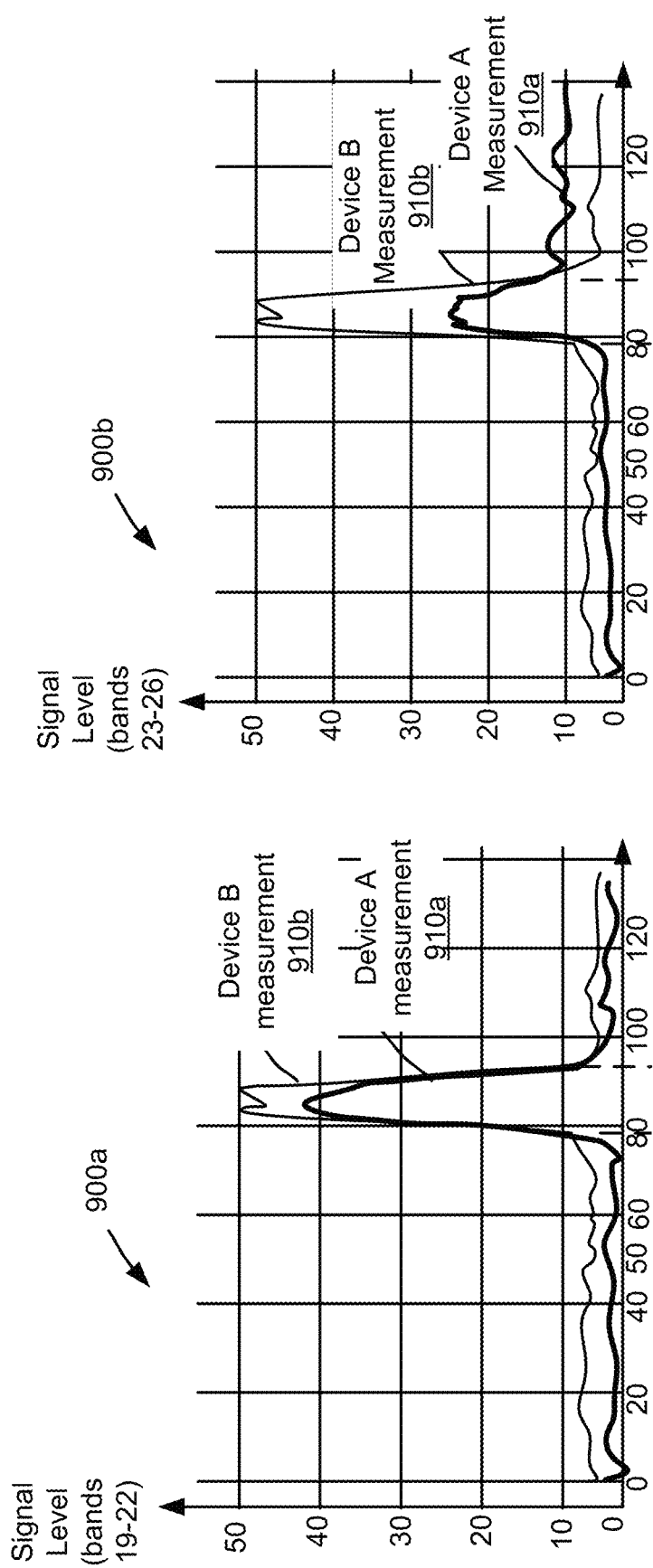
FIG. 9 illustrates an example of audio spectrums for high frequency bands of different ranges for audio data generated by two devices, according to embodiments of the present disclosure.

FIG. 9 illustrates examples of audio spectrums for high frequency bands of different ranges for audio data generated by two devices, according to embodiments of the present disclosure. The devices can correspond to device A 310*a* and device B 310*b* of FIG. 3. The plot 900*a* shows the audio spectrums of both devices (indicated with device A measurement 910*a* and device B measurement 910B in the plot 900*a*) corresponding to frequency bands nineteen through twenty-two. Similarly, audio spectrum 900*b* shows the audio spectrums of both devices (indicated with device A measurement 910*a* and device B measurement 910B in the plot 900*b*) corresponding to frequency bands twenty-three through twenty-six. As illustrated, the device B 310*b* has a higher audio signal level than a device A 310*a* over both subsets of frequency bands. But the difference is more significant in the plot 900*b*, which may indicate that frequency bands twenty-three through twenty-six are more indicative of the high frequency speech of the utterance than frequency bands nineteen through twenty-two. Both of the frequency bands from plots 900*a-b* may be used by an acoustic loudness model to generate a loudness score for the device A 310*a* and device B 310B.

Figure 10:
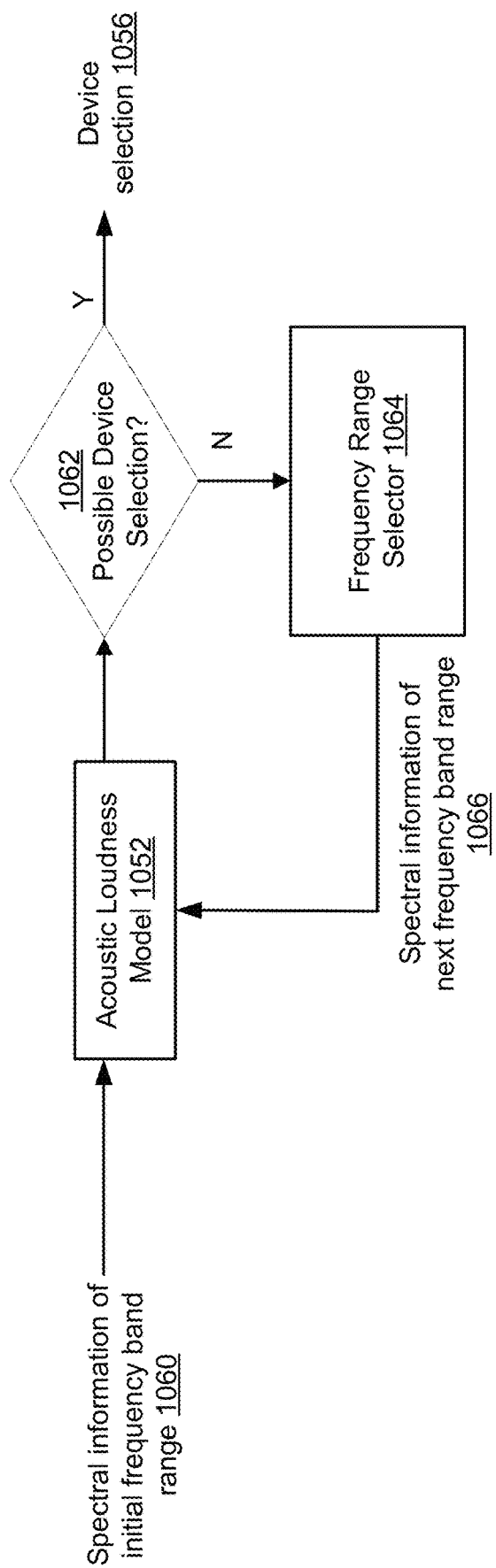
FIG. 10 illustrates an example of a process for selecting a frequency range and a device based on audio data generated by multiple devices, according to embodiments of the present disclosure.

FIG. 10 illustrates an example of a process for selecting a frequency range and a device based on audio data generated by multiple devices, according to embodiments of the present disclosure. The process may be performed by a computer system, such as the computer system 103 in FIG. 1.

In an example, an acoustic loudness model 1052 receives initial spectral information 1060 of an initial frequency range. In an example, the initial spectral information 1060 include data that represents, in the frequency domain, audio data generated based on an utterance detected by a device from a plurality of devices. The representation can be specific to a frequency range (e.g., between 20 Hz and 8,000 Hz) and can be granular to a plurality of frequency bands within the frequency rage (e.g., each frequency band being 250 Hz wide). The acoustic loudness model 1052 can output data that scores each device with respect to a likelihood that each device is to be selected as an input device such that additional audio data from the device is to be selected. A higher score can be associated with a higher likelihood of the utterance being directed to the device. This likelihood indicated for a device represents a likelihood that the utterance is directed to the device.

At block 1062, the computer system determines whether it is possible to select a device based on the output data of the acoustic loudness model 1052 (e.g., based on the likelihoods). For instance, if a likelihood generated for a device is above a likelihood threshold, the computer system can determine that the device can be identified in the device selection 1056. If multiple devices are associated with likelihoods above the likelihood threshold, none of the devices has a likelihood larger than the likelihood threshold, or the difference between the likelihood of two devices is smaller than a difference threshold, the computer system may determine that it is not yet possible to select a device as an input device for additional audio data. Additionally or alternatively, if the computer system determines a noise signal level (E.g., average amplitude of noise audio) in the initial spectral information 1060 is above a noise signal level threshold (e.g., an amplitude threshold), the computer system may determine that it is not yet possible to select a device. In this example, the noise signal level can be indicated by the spectral information associated with the first fifty frames. This spectral information can be specific to the entire frequency range (20 Hz to 8,000 Hz, or equivalently, the plurality of frequency bands), or only to a subset frequency range that fails to meet a frequency threshold (e.g., frequency range of 20 Hz to 2,500 Hz, where the frequency threshold is 2,500 Hz or, equivalently, frequency bands "2" through "10").

If the computer system determines a device cannot be selected, a frequency range selector 1064 can select a different frequency range for analysis. The frequency range selector 1064 may use a predefined subset of frequency ranges or, equivalently, frequency bands). For example, the frequency range selector 1064 may determine a frequency range that meets the frequency threshold (e.g., any frequency range between 2,500 Hz and 8,000 Hz, or equivalently, any frequency bands starting with frequency band "11").

In another example, the frequency band range selector 1064 may determine a value of the frequency threshold that the subset has to meet. For example, if the noise spectral information indicates that the noise is low or insignificant (e.g., meets an amplitude threshold) starting at a particular frequency or frequency band, the frequency threshold may be set to be equal to that particular frequency or frequency band. Alternatively, the noise signal level may be used to determine a property of the subset. The s property can be at least one of: a start of the frequency range, an end of the frequency range, or a number of frequency bands to include in the second frequency range. For example, the frequency range selector 1064 may select higher frequency bands and/or a smaller number of frequency bands for noisier environments. The frequency range selector 1064 may determine that multiple frequency ranges are to be selected, where the subsets may but need not overlap.

The computer system then generates next spectral information 1066 for the next frequency band range and inputs the next spectral information into the acoustic loudness model 1052. The process of outputting data indicating a likelihood is repeated. If the computer system determines the likelihood remains too low, the computer system may determine a second frequency threshold. The frequency range selector 1064 can then determine another subset of frequencies or frequency bands that meet the second frequency threshold.

The process of adjusting the frequency range may be repeated until a device can be selected or until no further processing is possible. This band selection process can be individually repeated across the different frames, where each iteration corresponds to a frame processing and the frequency band subset(s) can be selected for that frame.

Figure 11:
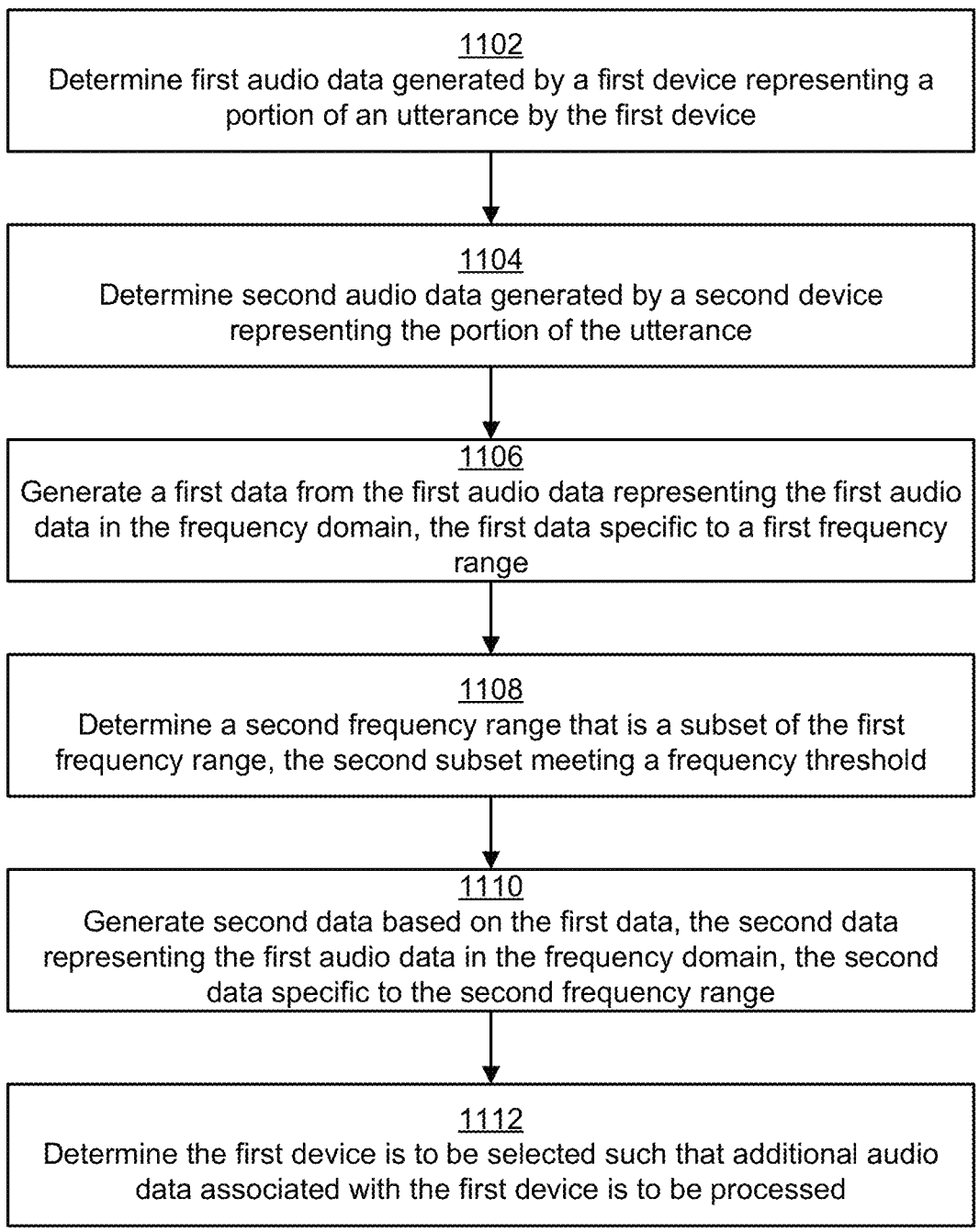
FIG. 11 illustrates an example of a flow for selecting a device, according to embodiments of the present disclosure.
Figure 12:
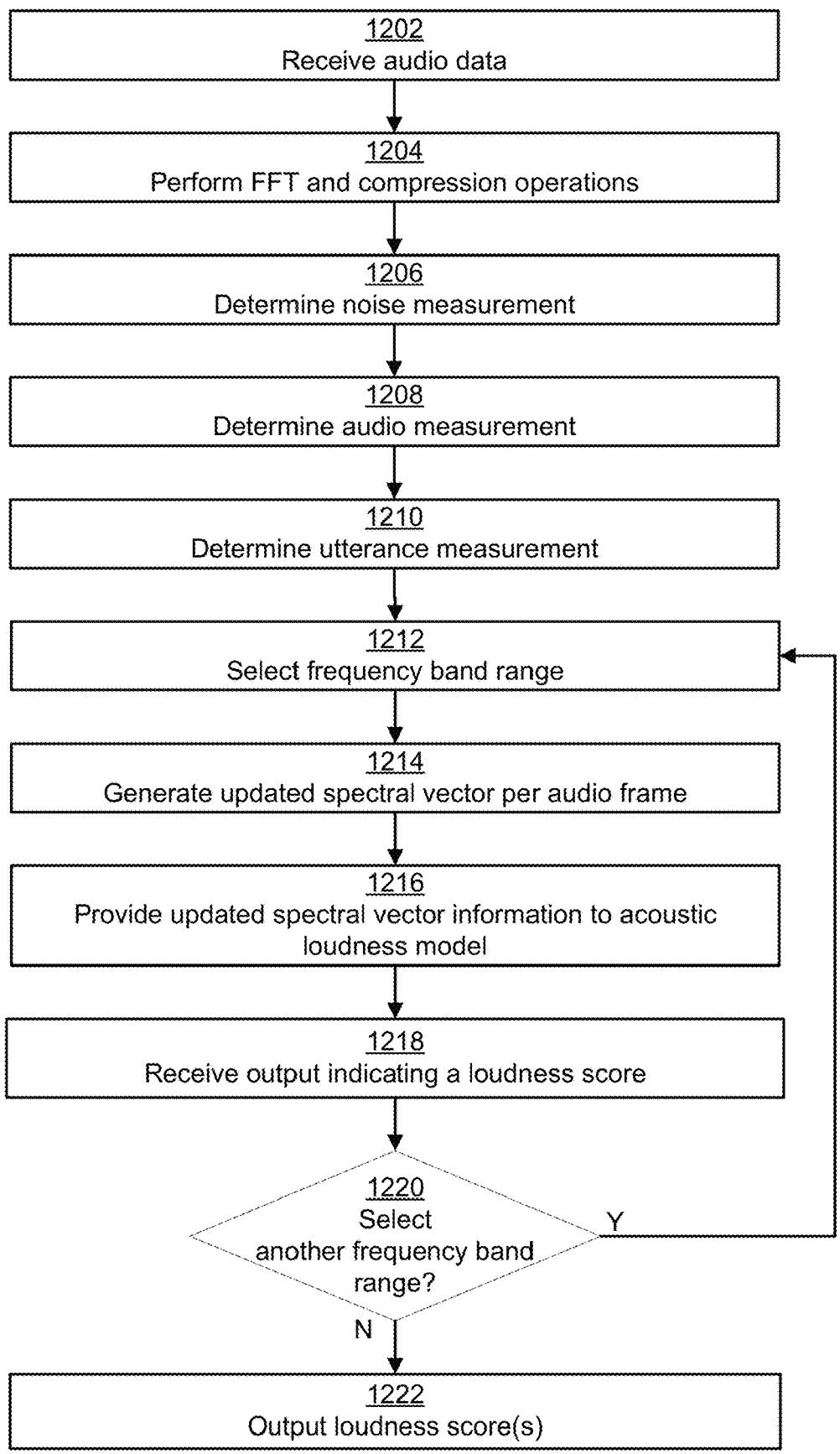
FIG. 12 illustrates an example of a flow for selecting a frequency band range and generating a loudness score for a device, according to embodiments of the present disclosure.

FIGS. 11 and 12 illustrate examples of flows for aspects of the present disclosure. Operations of the flows can be performed by a computer system, such as the computer system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 11 illustrates an example of a flow for selecting a device, according to embodiments of the present disclosure. In an example, the flow includes operation 1102, where the computer system determines first audio data generated by a first device and representing a portion of an utterance by the first device. A user can provide the utterance in a vicinity of multiple devices. In an example, the portion corresponds to 1.25 seconds of audio data and includes a first portion of 0.5 seconds and a second portion of 0.75 seconds. The first portion corresponds to noise audio detected by the first device prior to a detection by the first device of a wakeword included in the utterance. The second portion corresponds to utterance data that is generated by the first device and that represents at least the wakeword.

In an example, the flow includes operation 1104, where the computer system determines second audio data generated by a second device representing the portion of the utterance as detected by the second device. Here also, the computer system can receive this audio data from the second device. The second audio data includes a first portion and a second portion. The first portion corresponds to noise audio detected by the second device prior to a detection by the second device of the wakeword. The second portion corresponds to utterance data that is generated by the second device and that represents at least the wakeword.

In an example, the flow includes operation 1106, first data from the first audio data representing the first audio data in the frequency domain, where the first data is specific to a first frequency range. For example, the first data indicates a first spectral measurement of the first audio data (or at least a portion thereof) as a function of the first frequency range and/or frequency bands that belong to the first frequency range. The first spectral measurement can include first values that indicate at least of an amplitude, a power, or any other measurable signal level of the audio data, where each first value corresponds to a frequency, or where first values corresponding to a subset of the frequencies are combined to define a value for a frequency band that includes the frequencies of the subset. Combining can include summing, averaging, or performing any other statistical or measurement method on the first values. In an example, one hundred twenty-five audio frames are processed and correspond to the 1.25 seconds of audio. The first fifty frames correspond to the noise audio. Different first values can be defined for different portions of the audio data. For instance, the first values can be indexed using frame indexes. A first value is associated with a frame index and represents a signal level of the corresponding audio frame, where this signal level is the average across the different frequencies or frequency bands of the first frequency range.

In an example, the flow includes operation 1108, where the computer system determines a second frequency range that is a subset of the first frequency range, where the second frequency range meets a frequency threshold. The frequency threshold may be in the range of 2,500 Hz to 4,000 Hz, for example, 3,500 Hz. In this example, the second frequency range include frequencies that are larger than 3,500 Hz, or equivalently, frequency bands that are each 250 Hz wide and that start at frequency band "14" corresponding to the 3,500 Hz frequency threshold. As one example, the second frequency range can include frequency bands "23" to "26."

In an example, the flow includes operation 1110, where the computer system generates second data based on the first data, where the second data represents the first audio data in the frequency domain and is specific to the second frequency range. For example, the second data indicates a second spectral measurement of the first audio data (or at least a portion thereof) as a function of the second frequency range and/or frequency bands that belong to the second frequency range. The second spectral measurement can include second values that indicate at least of an amplitude, a power, or any other measurable signal level of the audio data, where each second value corresponds to a frequency, or where second values corresponding to a subset of the frequencies are combined to define a value for a frequency band that includes the frequencies of the subset. Combining can include summing, averaging, or performing any other statistical or measurement method on the first values. In an example, a second value specific to a frequency or frequency band is equal to a first value (as determined at operation 1106) for that same frequency or frequency band. Generally, a second value is associated with a frame index and represents a signal level of the corresponding audio frame, where this signal level is the average across the different frequencies or frequency bands of the second frequency range only.

In an example, the flow includes operation 1112, where the computer system determines that, between the first device and the second device, the first device is to be selected such that additional audio data associated with the first device is to be processed. This selection can be based on the second data and third data associated with the second audio data. This third data can be generated from the second audio data and associated with the second device by using similar operations as the ones described above. In an example, the selection is made by using the second data and the third data as inputs to an acoustic model, where this acoustic model outputs data indicating, per device, a likelihood associated with processing additional audio data generated by the device. Selection data indicating that the first device is selected can be sent to the first device and/or the second device, thereby causing the first device to be set as an input device for the additional audio data.

FIG. 12 illustrates an example of a flow for selecting a frequency band range and generating a loudness score for a device, according to embodiments of the present disclosure. In an example, the flow includes operation 1202, where the computer system receives audio data. The audio data corresponds to data generated by a device that receives an utterance. The audio data includes data corresponding to at least a portion of the utterance and data corresponding to a portion of time prior to the utterance.

In an example, the flow includes operation 1204, where the computer system performs an FFT and compression operations on the audio data. In an example, an FFT operation can be performed per audio frame and can involve audio samples of the audio frame and, optionally, additional audio samples from preceding and/or subsequent audio frame(s). The result of an FFT operation associated with a frame may include outputs across frequencies. A compression operation can compress the outputs by, for example, using frequency bands (e.g., of 250 Hz width) and summing the outputs according to the frequency bands to generate, for the frame, a spectral vector.

In an example, the flow includes operation 1206, where the computer system determines a noise measurement. The noise measurement can be an average noise signal level (e.g., average amplitude of the noise audio) during the portion of the audio data prior to the utterance. For example, the first fifty frames may correspond to the noise audio. The first fifty spectral vectors can be averaged. In this example, the noise measurement is represented by the average noise spectral vector.

In an example, the flow includes operation 1208, where the computer system determines an audio measurement. The audio measurement can be a total measurement of the audio signal level (e.g., amplitude of the audio) including superimposed noise and utterance data. For example, the audio measurement includes for each one of frames fifty-one and on, the corresponding audio spectral vector.

In an example, the flow includes operation 1210, where the computer system determines an utterance measurement. For example, the computer system can subtract, for each one of frames fifty-one and one, the average noise spectral vector from the corresponding audio spectral vector. The result of the subtraction is an utterance spectral vector for each one of frames fifty-one and on. The utterance measurement includes the utterance spectral vectors.

In an example, the flow includes operation 1212, where the computer system selects a frequency band range. The frequency band range is a subset of frequency bands above a frequency band threshold. The frequency band range may be selected based on a predefined frequency band range, the noise measurement, or another factor. For example, the computer system may have a predefined frequency band range of frequency band "2" to frequency band "32," but with a noise measurement above a measurement threshold, the computer system may select a frequency band range of frequency band "19" to frequency band "25."

In an example, the flow includes operation 1214, where the computer system generates an updated spectral vector per audio frame. For each one of frames fifty-one and on, the updated spectral vector includes the elements from the corresponding utterance spectral vector, where these elements correspond to the frequency bands of the subset.

In an example, the flow includes operation 1216, where the computer system provides updated spectral vector information to an acoustic loudness model (e.g., acoustic loudness model 452). For example, the updated spectral vectors for frames fifty-one and on are input to the acoustic loudness model. In another example, these updated spectral vectors are averaged and the average spectral vector is input to the acoustic loudness model.

In an example, the flow includes operation 1218, where the computer system receives output indicating a loudness score. The loudness score indicates a likelihood associated with the processing of additional audio data received from the device.

In an example, the flow includes operation 1220, where the computer system determines whether another frequency band range should be selected. The computer system may determine another frequency band range should be selected if the loudness score (or a likelihood) is below a score threshold (or a likelihood threshold) or if the loudness score (or the likelihood) is too similar to another loudness score (e.g., another likelihood) determined for another device that generates audio data for the utterance, where the similarity can be determined by computing the difference between the two scores (or likelihoods) and comparing it to a difference threshold. If the computer system determines another frequency band range should be selected, the flow returns to operation 1212. Otherwise, the flow proceeds to operation 1226.

In an example, the flow includes operation 1222, where the computer system outputs the loudness score(s) (or likelihoods). The loudness scores (or likelihoods) can then be used to determine whether the device is to be selected as an input device for additional audio data.

The overall system of the present disclosure may operate using various components as illustrated in FIG. 13. The various components may be located on same or different physical devices. Communication between various components may occur directly or across a network(s).

An audio capture component(s), such as a microphone or array of microphones of the device 110a, captures audio 1311a. The device 110a processes audio data, representing the audio 1311a, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 1311a/1311b, the devices 110a/110b may use a wakeword detection component 1320a/1320b to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 1311, is analyzed to determine if specific characteristics of the audio data match preconfigured acoustic waveforms, audio signatures, or other data to determine if the audio data "matches" stored audio data corresponding to a wakeword.

Thus, the wakeword detection component 1320 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 112a, representing the audio 1311a, to the system(s) 130, and the device 110b may "wake" and begin transmitting audio data 112b, representing the audio 1311b, to the system(s) 130. The audio data 112 may include data corresponding to the wakeword, or the device 110 may remove the portion of the audio corresponding to the wakeword prior to sending the audio data 112 to the system(s) 130.

An orchestrator component 1330 may receive the audio data 112. The orchestrator component 1330 may include memory and logic that enables the orchestrator component 1330 to transmit various pieces and forms of data to various components of the system, as well as perform other operations.

The orchestrator component 1330 sends the audio data 112 to an ASR component 1350. The ASR component 1350 transcribes the audio data 112 into text data. The text data output by the ASR component 1350 represents one or more than one (e.g., in the form of an n-best list) ASR hypotheses representing speech represented in the audio data 112. The ASR component 1350 interprets the speech in the audio data 112 based on a similarity between the audio data 112 and pre-established language models. For example, the ASR component 1350 may compare the audio data 112 with models for sounds (e.g., sub-word units, such as phonemes, etc.) and sequences of sounds to identify words that match the sequence of sounds of the speech represented in the audio data 112. The ASR component 1350 outputs text data representing one or more ASR hypotheses. The text data output by the ASR component 1350 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The NLU component 1360 attempts to make a semantic interpretation of the phrase(s) or statement(s) represented in the received text data. That is, the NLU component 1360 determines one or more meanings associated with the phrase(s) or statement(s) represented in the text data based on words represented in the text data. The NLU component 1360 determines an intent representing an action that a user desires be performed as well as pieces of the text data that allow a device (e.g., the device 110, the system(s) 130, a skill 1390, a skill system(s) 1325, etc.) to execute the intent. For example, if the text data corresponds to "play Adele music," the NLU component 1360 may determine an intent that the system(s) 130 output music and may identify "Adele" as an artist. For further example, if the text data corresponds to "what is the weather," the NLU component 1360 may determine an intent that the system(s) 130 output weather information associated with a geographic location of the device 110. In another example, if the text data corresponds to "turn off the lights," the NLU component 1360 may determine an intent that the system(s) 130 turn off lights associated with the device(s) 110 or a user(s). The NLU component 1360 may send NLU results data (which may include tagged text data, indicators of intent, etc.).

The system(s) 130 may include one or more skills 1390. A "skill" may be software running on the system(s) 130 that is akin to a software application running on a traditional computing device. That is, a skill 1390 may enable the system(s) 130 to execute specific functionality in order to provide data or produce some other requested output. The system(s) 130 may be configured with more than one skill 1390. For example, a weather service skill may enable the system(s) 130 to provide weather information, a car service skill may enable the system(s) 130 to book a trip with respect to a taxi or ride sharing service, a restaurant skill may enable the system(s) 130 to order a pizza with respect to the restaurant's online ordering system, etc. A skill 1390 may operate in conjunction between the system(s) 130 and other devices, such as the device 110, in order to complete certain functions. Inputs to a skill 1390 may come from speech processing interactions or through other interactions or input sources. A skill 1390 may include hardware, software, firmware, or the like that may be dedicated to a particular skill 1390 or shared among different skills 1390.

In addition or alternatively to being implemented by the system(s) 130, a skill 1390 may be implemented by a skill system(s) 1325. Such may enable a skill system(s) 1325 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 130 may be configured with a single skill 1390 dedicated to interacting with more than one skill system 1325.

Unless expressly stated otherwise, reference to a skill, skill device, skill component, or the like herein may include a skill 1390 operated by the system(s) 130 and/or skill operated by the skill system(s) 1325. Moreover, the functionality described herein as a skill may be referred to using many different terms, such as an action, bot, app, or the like.

The system(s) 130 may include a post-NLU ranker 1365 that receives NLU results data and determines (as described in detail herein) which skill the system(s) 130 should invoke to execute with respect to the user input. The post-NLU ranker 1365 may be implemented separately from the orchestrator component 1330 (as illustrated) or one or more components of the post-NLU ranker 1365 may be implemented as part of the orchestrator component 1330.

The system(s) 130 may include a TTS component 1380. The TTS component 1380 may generate audio data (e.g., synthesized speech) from text data using one or more different methods. Text data input to the TTS component 1380 may come from a skill 1390, the orchestrator component 1330, or another component of the system(s) 130.

In one method of synthesis called unit selection, the TTS component 1380 matches text data against a database of recorded speech. The TTS component 1380 selects matching units of recorded speech and concatenates the units together to form audio data. In another method of synthesis called parametric synthesis, the TTS component 1380 varies parameters such as frequency, volume, and noise to create audio data including an artificial speech waveform. Parametric synthesis uses a computerized voice generator, sometimes called a vocoder.

The system(s) 130 may include profile storage 1370. The profile storage 1370 may include a variety of information related to individual users, groups of users, devices, etc. that interact with the system(s) 130. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 1370 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 130 with permission to allow the skill to execute with respect to the user's inputs. If a user does not enable a skill, the system(s) 130 may not permit the skill to execute with respect to the user's inputs.

The profile storage 1370 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 1370 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 14:
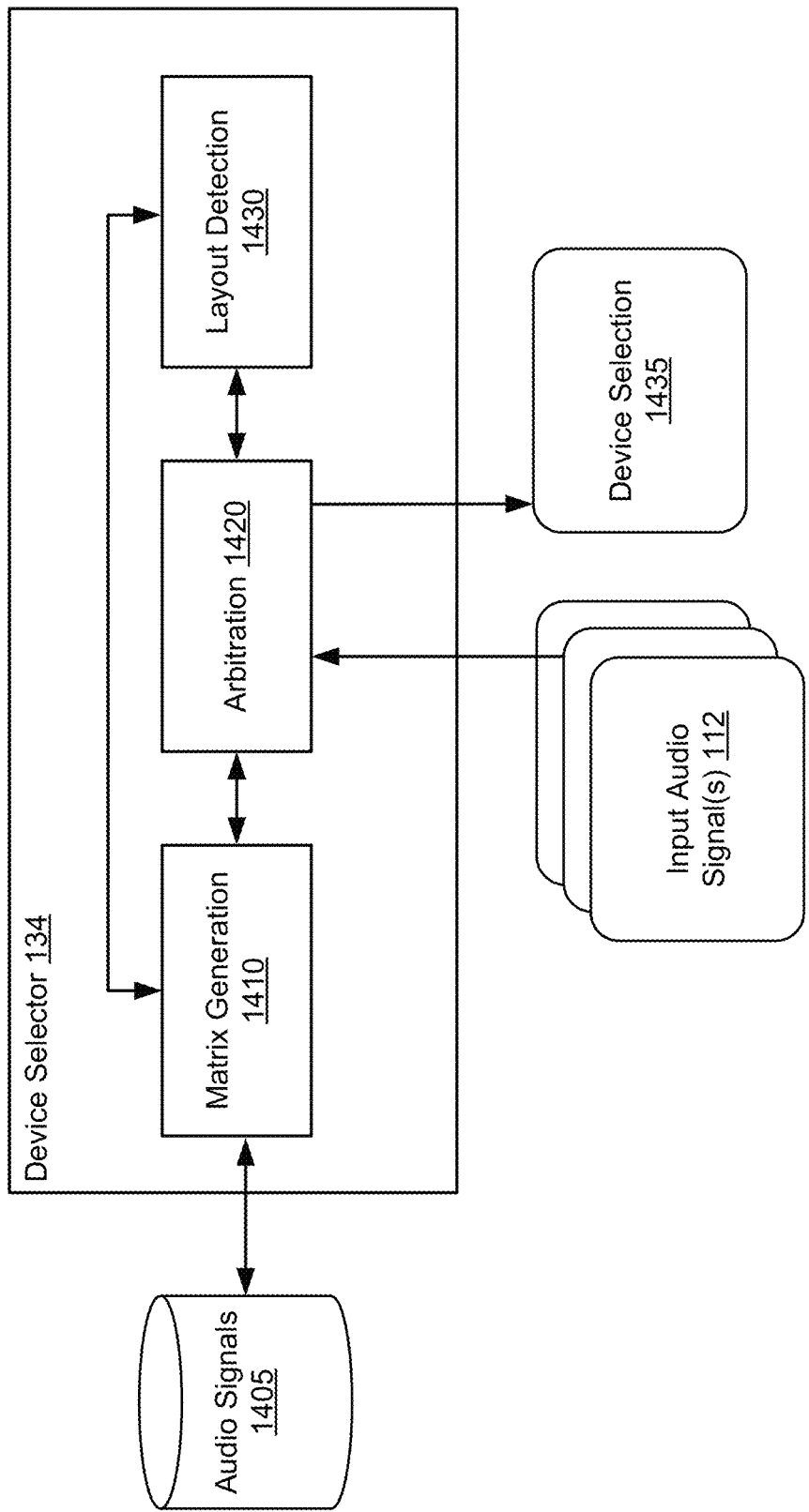
FIG. 14 is a conceptual diagram illustrating components of a device arbitration component according to embodiments of the present disclosure.

The system(s) 130 may include a links action manager component 1395, operations of which are described further in connection with FIG. 14. The links action manager component 1395 may facilitate determining which skills are registered to perform an action, validate payload data received from a skill to determine whether the action can be performed by another skill, and facilitate other functionalities described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The ASR 1350, and NLU 1360, Post-NLU ranger 1365 can be implemented as components of the audio processor 132 illustrated in FIG. 1. The system(s) 130 may include a device selector 134 that may be configured to generate a characteristic matrix representing relative locations of multiple devices 110 within a user's household, process audio signals from multiple devices 110 and perform device arbitration to select a device 110 for further processing. In some embodiments, the device 110 may include the device selector 134.

FIG. 14 is a conceptual diagram illustrating components of a device selector 134 that the system 100 may use to perform arbitration according to embodiments of the present disclosure. The device selector 134 may include a matrix generation component 1410, an arbitration component 1420 and a layout detection component 1430.

In some embodiments, the device selector 134 may use stored audio signals 1405 to generate the characteristic matrix as described below. The audio signals 1405 may also be stored in the profile storage 1370, and may represent past utterances spoken by the user. The input audio signals 112 may be received from multiple devices 110 within the user's household and may represent an input utterance spoken by the user. The device selection 1435 may be an indication or data indicating which device the device selector 134 selects for further processing.

The matrix generation component 1410 may generate a characteristic matrix that is used by the arbitration component 1420 to perform device arbitration using the input audio signals 112. The layout detection component 1430 may detect a change in the device layout using information from the arbitration component 1420 and the characteristic matrix, and may send information to the characteristic matrix to update the values in the characteristic matrix.

The matrix generation component 1410 may be configured to determine the characteristic matrix corresponding to a relative location of the devices 110 within the user's household. The matrix generation component 1410 may perform one or more functionalities described below.

Audio propagates through air as a pressure wave. The "volume" or perceived loudness of the wave realized by a device is measured as sound pressure level. As audio waves propagate through air, they lose energy; thus, as the destination/receiving device gets further away from the source, the sound pressure level at the receiving device decreases. Microphones have a "gain" characteristic that is a scalar value/number that when multiplied with sound pressure level measured at the microphone, provides the signal output value from the microphone.

When a user speaks, the sound pressure level of associated audio signal is the strongest as it emanates from the user's mouth. As the audio signal propagates through the air and reflects off of surfaces, the utterance reaches the device 110a (D1), for example. The signal (d1) received by device D1 may be calculated as:

$$d1 = s \times A1 \times G1,$$

where s refers to the sound pressure level, A1 refers to the attenuation of the signal received by device D1, and G1 refers to the microphone gain corresponding to device D1.

Depending on the location of other devices, the device 110*b* (D2) may also receive an audio signal corresponding to the utterance captured by the device 110*a*. The signal (d2) received by device D2 may be calculated as:

$$d2 = s \times A2 \times G2,$$

where s refers to the sound pressure level, A2 refers to the attenuation of the signal received by device D1, and G2 refers to the microphone gain corresponding to device D2.

In the simplest example, assuming the user is close to D1 when speaking the utterance, the attenuation A1 can be estimated to be 1.0. That is, the signal d1 received by D1 experienced none or negligible energy loss. In this example, then the attenuation A2 represents the acoustic attenuation of the path from the device D1 to the device D2, which may be referred to as the inter-device attenuation corresponding to D1 and D2. Determination of the inter-device attenuation in this example is as follows:

$$d2/d1 = (s \times A2 \times G2)/(s \times A1 \times G1)$$

$$d2/d1 = (A2/A1) \times (G2/G1)$$

Since A1 is 1.0 in this example, the above simplifies to:

$$d2/d1 = A \times (G2/G1) \qquad \text{Equation 1}$$

The matrix generation component 310 may store the attenuation factor A calculated in the above Equation 1 in a characteristic matrix representing the inter-device attenuation factor from D1 to D2 (e.g., A12).

In some embodiments, the attenuation of the path from the device D2 to the device D1 may be different than the path from the device D1 to the device D2. The system may determine the inter-device attenuation for the path from D1 to D2 (referred to as A12) and may determine the inter-device attenuation for the path from D2 to D1 (referred to as A21). In some embodiments, to determine A21, the system 100 may use an audio signal that originates close to the device D2. That is, the system may use an utterance that the user speaks while close to the device D2, causing the attenuation experienced by D2 to be 1.0 (representing no or negligible energy loss), and resulting in the following calculations:

$$d2/d1 = (A2/A1) \times (G2/G1)$$

Since A2 is 1.0 in this example, the above simplifies to:

$$d2/d1 = A \times (G2/G1) \qquad \text{Equation 2}$$

The matrix generation component 310 may store the attenuation factor A calculated in the above Equation 2 in a characteristic matrix representing the inter-device attenuation factor from D2 to D1 (e.g., A21).

Thus, the matrix generation component 1410 may generate the following example characteristic matrix for the above example:

| Characteristic Matrix 1 | | |
|---|---|---|
|  | D1 | D2 |
| D1 | 1.0 | A21 |
| D2 | A12 | 1.0 |

As illustrated in the above characteristic matrix, the inter-device attenuation factor between D1 and D1 is set to 1.0. This represents the concept that if an audio signal originates at D1 (e.g., is generated by D1) and heard by D1, then no signal energy loss is experienced by D1, causing the attenuation to be 1.0.

In other embodiments, the attenuation for the path from D1 to D2 may be the same as the attenuation for the path from D2 to D1. That is, A12=A21. In this case, the system may generate the characteristic matrix accordingly.

The following non-limiting example is presented to illustrate how the matrix generation component 1410 may determine the characteristic matrix based on more than two devices. In this example, a user's home may have four devices 110, referred to as D1, D2, D3 and D4. For illustration purposes, assume that the devices are placed in a row, about 20 feet apart, and that received signal energy degrades by 1% per foot. So, a signal energy received at D1 at a level of 100 is received at D2 at a level of 80, is received at D3 at a level of 60, and is received at D4 at a level of 40. Moreover, a signal energy received at D2 at a level of 100 is received by D1 and D3 at a level of 80 (since each is 20 feet apart from D2) and is received by D4 at a level of 60 (since it is 40 feet away from D2).

Using this information, the matrix generation component 1410 may generate the following example characteristic matrix for this example:

| Characteristic Matrix 2 | | | | |
|---|---|---|---|---|
|  | D1 | D2 | D3 | D4 |
| D1 | 1.0 | 0.8 | 0.6 | 0.4 |
| D2 | 0.8 | 1.0 | 0.8 | 0.6 |
| D3 | 0.6 | 0.8 | 1.0 | 0.8 |
| D4 | 0.4 | 0.6 | 0.8 | 1.0 |

Thus, in some embodiments, the row and column corresponding to a first device (e.g., D1) in the characteristic matrix represents the case when an audio signal is closest to the first device, and includes attenuation factors experienced by the other devices. In other words, when the audio signal is closest to D1, the attenuation factor corresponding to D2 is 0.8, the attenuation factor corresponding to D3 is 0.6, and so on. In some embodiments, the row corresponding to a device may be referred to as an attenuation vector.

Figure 15:
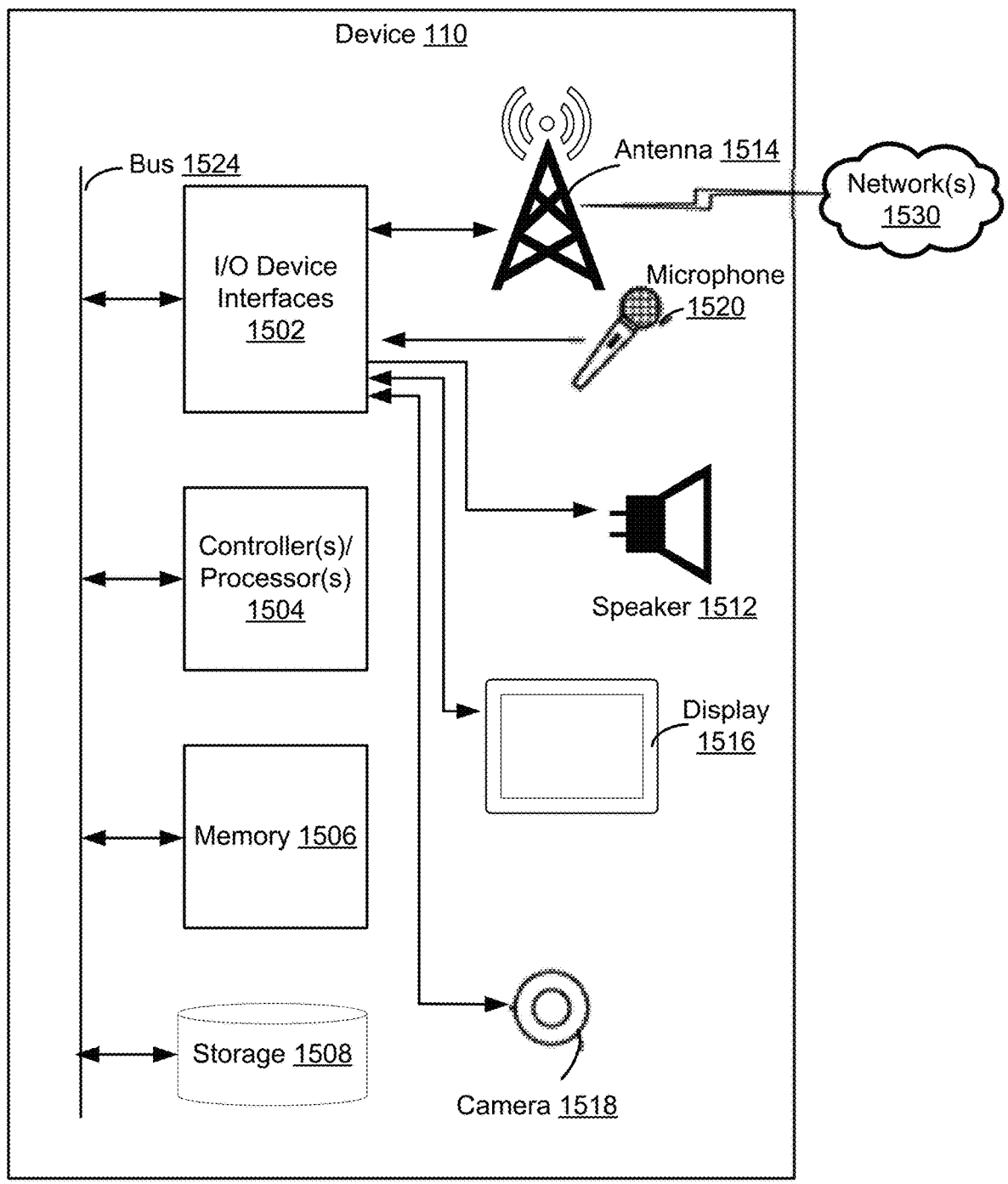
FIG. 15 is a block diagram conceptually illustrating example components of a device according to embodiments of the present disclosure.
Figure 16:
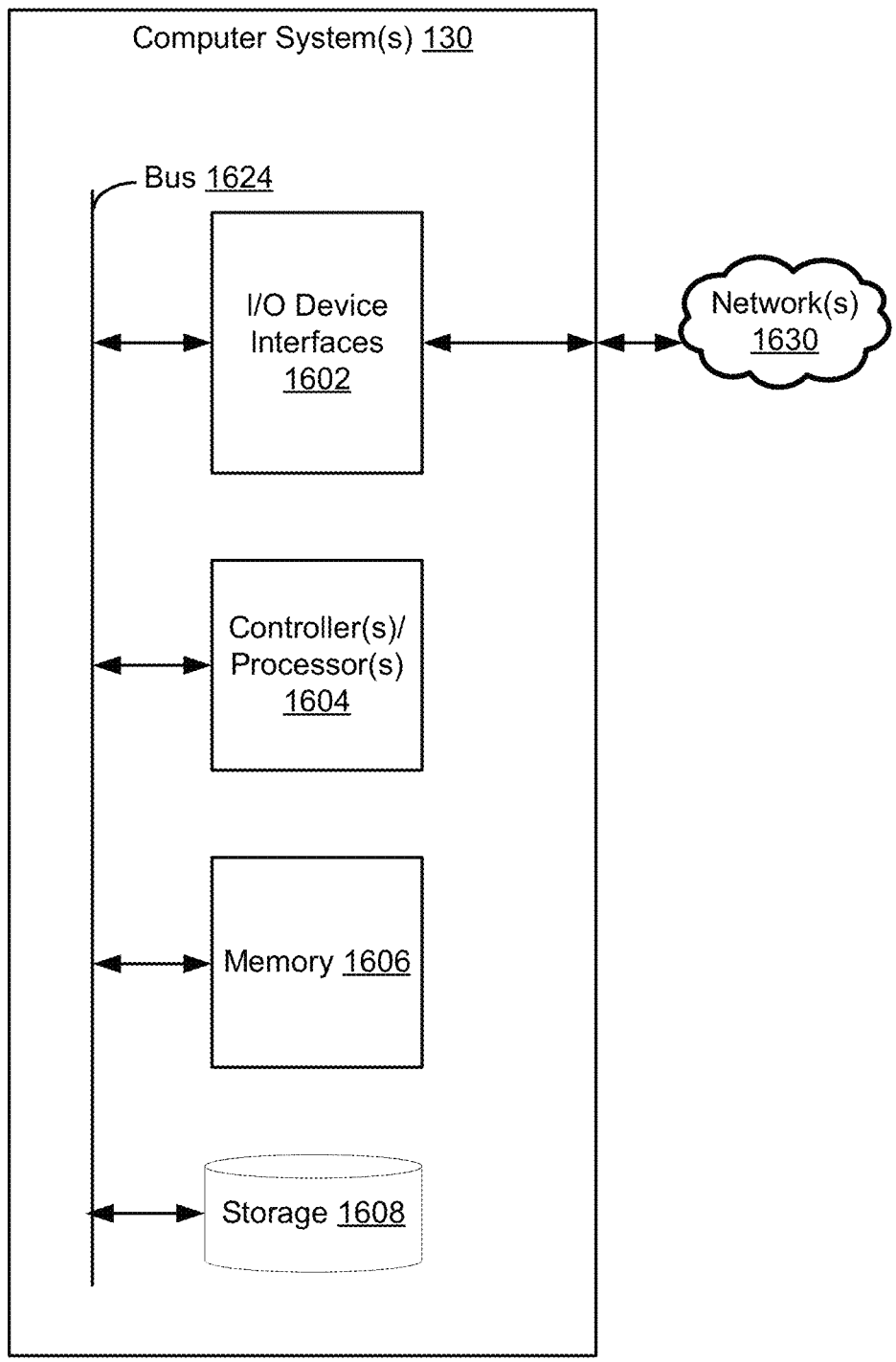
FIG. 16 is a block diagram conceptually illustrating example components of a server according to embodiments of the present disclosure.

FIG. 15 is a block diagram conceptually illustrating a device 110 that may be used with the computer system described herein above. FIG. 16 is a block diagram conceptually illustrating example components of a remote device, such the computer system 150, which may assist with ASR processing, NLU processing, etc., and the skill system(s). A computer system may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple computer systems may be included in the overall system of the present disclosure, such as one or more systems for performing ASR processing, one or more computer systems for performing NLU processing, one or more skill systems for performing actions responsive to user inputs, etc. In operation, each of these systems may include computer-readable and computer-executable instructions that reside on the respective computer system, as will be discussed further below.

Each of these devices 110 or computer systems 130 may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device or computer system (110/130) may also include a data storage component (1508/1608) for storing data and controller/processor-executable instructions. Each data storage component (1508/1608) may individually include one or more non-volatile storage types such as magnetic storage, optical storage, solid-state storage, etc. Each device or computer system (110/130) may also be connected to removable or external non-volatile memory and/or storage (such as a removable memory card, memory key drive, networked storage, etc.) through respective input/output device interfaces (1502/1602).

Computer instructions for operating each device or computer system (110/130) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device or computer system (110/130) includes input/output device interfaces (1502/1602). A variety of components may be connected through the input/output device interfaces (802/902), as will be discussed further below. Additionally, each device or computer system (110/130) may include an address/data bus (1524/1624) for conveying data among components of the respective device. Each component within a device or computer system (110/130) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 1530 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 1530, the system may be distributed across a networked environment. The I/O device interface (1502/1602) may also include communication components that allow data to be exchanged between devices such as different physical servers in a collection of servers or other components.

The components of the device(s) 110, the computer system(s) 130, or the skill system(s) may include their own dedicated processors, memory, and/or storage. Alternatively, one or more of the components of the device(s) 110, the computer system(s) 130, or the skill system(s) may utilize the I/O interfaces (1502/1602), processor(s) (1504/1604), memory (1506/1606), and/or storage (1508/1608) of the device(s) 110, the computer system(s) 130, or the skill system(s), respectively. Thus, the ASR component may have its own I/O interface(s), processor(s), memory, and/or storage; the NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the computer system(s) 130, and the skill system(s), as described herein, are illustrative, and may be located as a stand-alone device or may be included, in whole or in part, as a component of a larger device or system.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   one or more memories storing computer-readable instructions that, upon execution by the one or more processors, configure the system to:
      determine first audio data generated by a first device, the first audio data representing a portion of an utterance;
      determine second audio data generated by a second device, the second audio data representing the portion of the utterance;
      generate first spectral measurement data from the first audio data, the first spectral measurement data indicating first values of an amplitude of the portion of the utterance, each first value corresponding to a different frequency band within a frequency range of 20 Hz to 8,000 Hz, the first spectral measurement data generated by at least:
         generating second values by performing Fast Fourier Transform (FFT) operations on the first audio data, each second value corresponding to a different frequency within the frequency range, and
         generating the first values by combining subsets of the second values, each first value associated with a frequency band and generated by combining a subset of the second values associated with frequencies within the frequency band;
      determine a plurality of frequency bands that are above 2,500 Hz;
      generate second spectral measurement data indicating third values of the amplitude, each third value corresponding to one of the plurality of frequency bands and equal to one of the first values; and
      select, based at least in part on the second spectral measurement data and third spectral measurement data associated with the second audio data of the second device, the first device such that additional audio data associated with the first device is processed.

2. The system of claim 1, wherein the one or more memories store additional computer-readable instructions that, upon execution by the one or more processors, configure the system to:
   determine, by at least using the first spectral measurement data as first input data to an acoustic model, a first likelihood associated with processing the additional audio data of the first device;
   determine that the first likelihood fails to meet a threshold;
   determine, by at least using the second spectral measurement data as second input data to the acoustic model, a second likelihood associated with the processing of the additional audio data; and
   determine that the second likelihood meets threshold, wherein the first device is selected based at least in part on the second likelihood.

3. The system of claim 1, wherein the one or more memories store additional computer-readable instructions that, upon execution by the one or more processors, configure the system to:
   determine third audio data generated by the first device, the third audio data representing noise detected by the first device prior to a detection of the utterance;
   generate fourth spectral measurement data from the third audio data, the fourth spectral measurement data indicating an average amplitude of the noise; and
   select the plurality of frequency bands based at least in part on a determination that the average amplitude meets a threshold.

4. A computer-implemented method comprising:
   determining first audio data representing at least an utterance detected by a first device;
   generating, based at least in part on the first audio data, first spectral measurement data representing at least a first portion of the utterance in a frequency domain, the first spectral measurement data specific to a first frequency range;
   determining a second frequency range that is a subset of the first frequency range, the second frequency range meeting a frequency threshold;
   generating, based at least in part on the first spectral measurement data, second spectral measurement data that represents the at least first portion in the frequency domain, the second spectral measurement data specific to the second frequency range; and
   selecting, based at least in part on the second spectral measurement data, the first device instead of a second device such that a second portion of the first audio data is processed instead of second audio data that is generated by the second device and that represents at least the utterance.

5. The computer-implemented method of claim 4, further comprising:
   receiving the first audio data from the first device;
   receiving the second audio data from the second device, the second audio data representing the utterance; and
   generating, based at least in part on the second audio data, third spectral measurement data that represents the at least first portion in the frequency domain, the third spectral measurement data specific to the second frequency range and associated with the second device,
   wherein the first device is selected further based at least in part on the third spectral measurement data.

6. The computer-implemented method of claim 4, further comprising:
   determining third audio data that represents noise detected by the first device prior to a detection of the utterance; and
   generating, based at least in part on the third audio data, third spectral measurement data that represents an average amplitude of the noise in the frequency domain, wherein the second spectral measurement data is generated upon a determination that the average amplitude meets an amplitude threshold.

7. The computer-implemented method of claim 6, further comprising:
   determining a value of the frequency threshold based at least in part on the average amplitude.

8. The computer-implemented method of claim 6, further comprising:
   determining a property of the second frequency range based at least in part on the average amplitude, the property comprising at least one of: a start of the second frequency range, an end of the second frequency range, or a number of frequency bands to include in the second frequency range.

9. The computer-implemented method of claim 4, further comprising:
   determining, based at least in part on the first spectral measurement data, a first likelihood associated with processing additional audio data of the first device, wherein the second spectral measurement data is generated upon a determination that the first likelihood fails to meet a likelihood threshold.

10. The computer-implemented method of claim 9, further comprising:
    determining, based at least in part on the second spectral measurement data, a second likelihood associated with the processing of the second portion;
    determining that the second likelihood fails to meet the likelihood threshold;
    determining a third frequency range that is a different subset of the first frequency range, the third frequency range meeting the frequency threshold; and
    generating, based at least in part on the first spectral measurement data, third spectral measurement data that represents the at least first portion in the frequency domain, the third spectral measurement data specific to the third frequency range, wherein the determining that the second portion is to be processed is further based at least in part on the third spectral measurement data.

11. The computer-implemented method of claim 9, wherein the frequency threshold is a first frequency threshold, and wherein the computer-implemented method further comprises:
    determining, based at least in part on the second spectral measurement data, a second likelihood associated with the processing of the second portion;
    determining that the second likelihood fails to meet the likelihood threshold;
    determining a third frequency range that is a different subset of the first frequency range, the third frequency range meeting a second frequency threshold; and
    generating, based at least in part on the first spectral measurement data, third spectral measurement data that represents the at least first portion in the frequency domain, the third spectral measurement data specific to the third frequency range, wherein the determining that the second portion is to be processed is further based at least in part on the third spectral measurement data.

12. The computer-implemented method of claim 4, further comprising:
    determining a third frequency range that is a different subset of the first frequency range, the third frequency range meeting the frequency threshold; and
    generating, based at least in part on the first spectral measurement data, third spectral measurement data that represents the at least first portion in the frequency domain, the third spectral measurement data specific to the third frequency range, wherein the determining that the second portion is to be processed is further based at least in part on the third spectral measurement data.

13. The computer-implemented method of claim 4, further comprising:
    generating, based at least in part on a third portion of the first audio data, third spectral measurement data that represents the third portion in the frequency domain, the third spectral measurement data specific to the second frequency range, wherein the determining that the second portion is to be processed is further based at least in part on the third spectral measurement data.

14. The computer-implemented method of claim 13, further comprising:
    determining fourth spectral measurement data based at least in part on the second spectral measurement data and the third spectral measurement data, the fourth spectral measurement data indicating an average amplitude of the utterance, wherein the determining that the second portion is to be processed is further based at least in part on the fourth spectral measurement data.

15. The computer-implemented method of claim 4, further comprising:
    determining third audio data that represents noise detected by the first device prior to a detection of the utterance;
    generating, based at least in part on the third audio data, third spectral measurement data that represents an average amplitude of the noise in the frequency domain;
    determining that the average amplitude meets an amplitude threshold; and
    generating a likelihood of the third audio data representing the at least first portion of the first audio data in the frequency domain.

16. A system, comprising:
    one or more processors; and
    one or more memories storing computer-readable instructions that, upon execution by the one or more processors, configure the system to:
       determine first audio data representing an utterance detected by a first device;
       generate, based at least in part on the first audio data, first spectral measurement data representing at least a first portion of the utterance in a frequency domain, the first spectral measurement data specific to a first frequency range;
       determine a second frequency range that is a subset of the first frequency range, the second frequency range meeting a frequency threshold;
       generate, based at least in part on the first spectral measurement data, second spectral measurement data that represents the at least first portion in the frequency domain, the second spectral measurement data specific to the second frequency range; and
       select, based at least in part on the second spectral measurement data, the first device instead of a second device such that a second portion of the first audio data is processed instead of second audio data that is generated by the second device.

17. The system of claim 16, wherein the one or more memories store additional computer-readable instructions that, upon execution by the one or more processors, configure the system to:
    determine third audio data that represents noise detected by the first device prior to a detection of the utterance;

generate, based at least in part on the third audio data, third spectral measurement data that represents an average amplitude of the noise in the frequency domain; and generate fourth spectral measurement data based at least in part on the second spectral measurement data and the third spectral measurement data, wherein the fourth spectral measurement data represents a portion of a wakeword included in the utterance, the fourth spectral measurement data specific to the second frequency range.

18. The system of claim 16, wherein the one or more memories store additional computer-readable instructions that, upon execution by the one or more processors, configure the system to:

determine third frequency range that is a different subset of the first frequency range, the third frequency range meeting the frequency threshold; and generate, based at least in part on the first spectral measurement data, third spectral measurement data that represents the at least first portion in the frequency domain, the third spectral measurement data specific to the third frequency range, wherein the is first device is selected further based at least in part on the third spectral measurement data.

19. The system of claim 16, wherein the second frequency range is determined by at least selecting the second frequency range from the first frequency range based at least in part on third spectral measurement data corresponding to noise that is detected by the first device prior to the utterance.

20. The system of claim 16, wherein the one or more memories store additional computer-readable instructions that, upon execution by the one or more processors, configure the system to:

indicate, to the second device, to stop generating additional audio data corresponding to the utterance.

\* \* \* \* \*